(12) United States Patent
Roper et al.

(10) Patent No.: US 9,835,383 B1
(45) Date of Patent: Dec. 5, 2017

(54) PLANAR HEAT PIPE WITH ARCHITECTED CORE AND VAPOR TOLERANT ARTERIAL WICK

(71) Applicant: HRL LABORATORIES, LLC, Malibu, CA (US)

(72) Inventors: Christopher S. Roper, Santa Monica, CA (US); Robert W. Cumberland, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 677 days.

(21) Appl. No.: 14/211,839

(22) Filed: Mar. 14, 2014

Related U.S. Application Data

(60) Provisional application No. 61/801,638, filed on Mar. 15, 2013.

(51) Int. Cl.
  *F28D 15/04* (2006.01)
  *B23P 15/26* (2006.01)

(52) U.S. Cl.
  CPC .............. *F28D 15/04* (2013.01); *B23P 15/26* (2013.01)

(58) Field of Classification Search
  CPC .... F28D 15/04; F28D 15/0233; F28D 15/043; B23P 15/26
  USPC ........................ 165/104.26, 104.22, 104.21
  See application file for complete search history.

(56) References Cited

U.S. PATENT DOCUMENTS 3,024,298 A  3/1962 Goltsos et al.
3,609,991 A  10/1971 Chu et al.
3,844,342 A  10/1974 Eninger et al.
4,519,447 A  5/1985 Wiech, Jr.
4,706,740 A  11/1987 Mahefkey
5,390,077 A  2/1995 Paterson
5,508,884 A  4/1996 Brunet et al.
(Continued)

FOREIGN PATENT DOCUMENTS

EP  1842021 A1  10/2007
EP  2317267 A2  5/2011
WO  WO 2006/058494 A1  6/2006

OTHER PUBLICATIONS

Carter et al., U.S. Appl. No. 12/691,393, filed Jan. 21, 2010 entitled "Microtruss Based Thermal Heat Spreading Structures," 45 pages.
(Continued)

*Primary Examiner* — Jianying Atkisson
*Assistant Examiner* — Raheena R Malik
(74) *Attorney, Agent, or Firm* — Lewis Roca Rothgerber Christie LLP

(57) ABSTRACT

A planar heat pipe for transferring heat between a higher temperature region and a lower temperature region includes a bottom facesheet, a top facesheet, a vapor-venting arterial wick between the bottom facesheet and the top facesheet and including a high permeability layer and a high capillary pressure layer each having pores such that an average pore hydraulic diameter in the high permeability layer is greater than an average pore diameter in the high capillary pressure layer. The pipe also includes an architected mechanical core structure between the arterial wick and the top facesheet, and a working fluid between the bottom facesheet and the top facesheet. The architected mechanical core structure may have a vapor region, and the vapor-venting arterial wick may have a liquid region.

20 Claims, 14 Drawing Sheets

(56) References Cited

U.S. PATENT DOCUMENTS

| | | |
|---|---|---|
| 5,529,115 A | 6/1996 | Paterson |
| 5,694,295 A | 12/1997 | Mochizuki et al. |
| 6,082,443 A | 7/2000 | Yamamoto et al. |
| 6,085,831 A | 7/2000 | DiGiacomo et al. |
| 6,550,531 B1 | 4/2003 | Searls et al. |
| 6,880,626 B2 | 4/2005 | Lindemuth et al. |
| 7,382,959 B1 | 6/2008 | Jacobsen |
| 7,775,261 B2 * | 8/2010 | Valenzuela ......... F28D 15/0233 165/104.21 |
| 8,579,018 B1 | 11/2013 | Roper et al. |
| 8,921,702 B1 | 12/2014 | Carter et al. |
| 2008/0283222 A1 | 11/2008 | Chang et al. |
| 2011/0088877 A1 * | 4/2011 | Oniki .................... F28D 15/046 165/104.26 |
| 2011/0253345 A1 * | 10/2011 | Ryoson ............... F28D 15/0233 165/104.26 |
| 2012/0241133 A1 | 9/2012 | Yan et al. |
| 2012/0305222 A1 * | 12/2012 | Yang .................... F28D 15/046 165/104.26 |
| 2012/0305223 A1 * | 12/2012 | Yang .................... F28D 15/046 165/104.26 |
| 2012/0325437 A1 * | 12/2012 | Meyer, IV ............ F28F 21/084 165/104.26 |
| 2013/0269913 A1 * | 10/2013 | Ueda ................... F28D 15/0233 165/104.26 |
| 2013/0312939 A1 * | 11/2013 | Uchida ................... F28D 15/04 165/104.26 |
| 2015/0198380 A1 * | 7/2015 | Haj-Hariri ............... B64G 1/50 62/3.2 |

OTHER PUBLICATIONS

Eninger, "Menisci Coalescence as a Mechanism for Venting Noncondensable Gas from Heat-Pipe Arteries," AIAA No. 74-748, Thermophysics and Heat Transfer Conference, 5 pages, Jul. 15-17, 1974.

Eninger, "Priming Foils for Venting Noncondensable Gas from Heat-Pipe Arteries," Heat Transfer with Thermal Control Applications. 39:235-243, 1975.

Hwang et al., "Multi-artery heat-pipe spreader: Lateral liquid supply," International Journal of Heat and Mass Transfer, 54:2334-2340, 2011.

Kaya et al., "Investigation of the Thermal Performance Characteristics of a Variable Conductance Arterial Heat Pipe," Frontiers in Heat Pipes, 2, 013004, pp. 1-9, 2011.

* cited by examiner

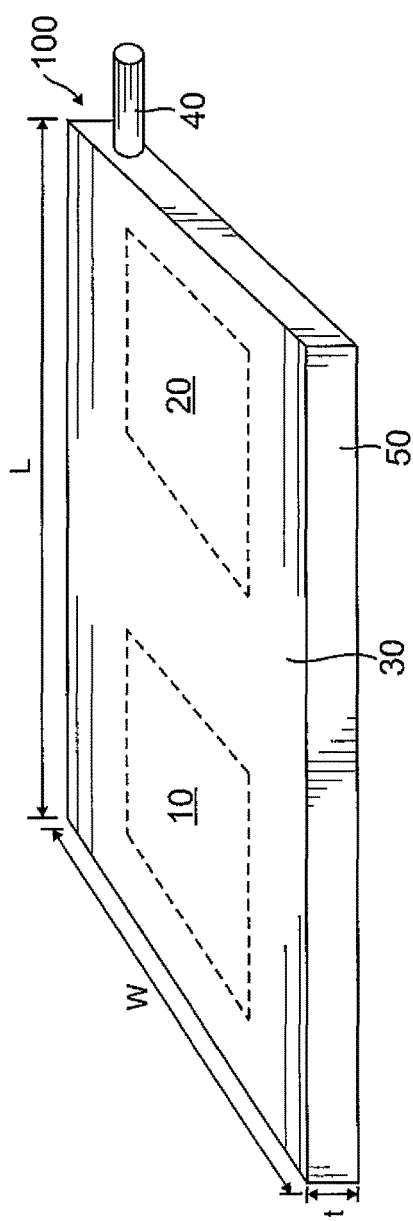
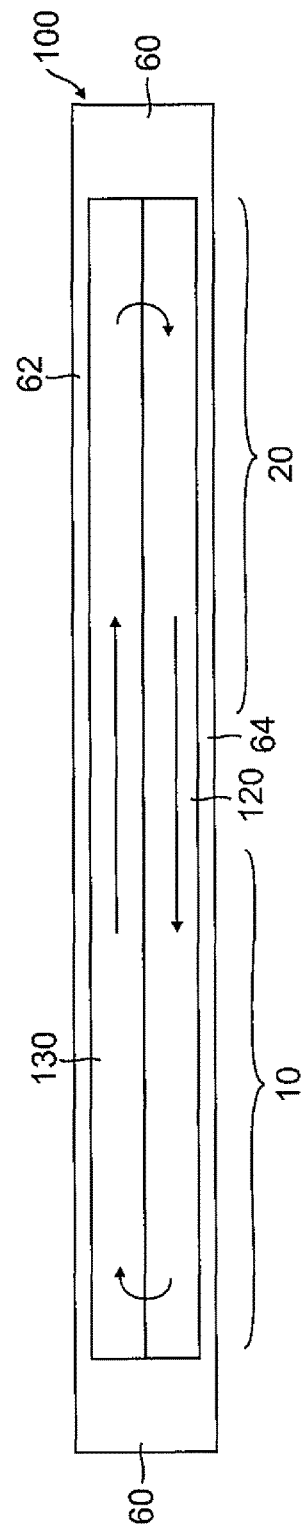
FIG. 1
FIG. 2

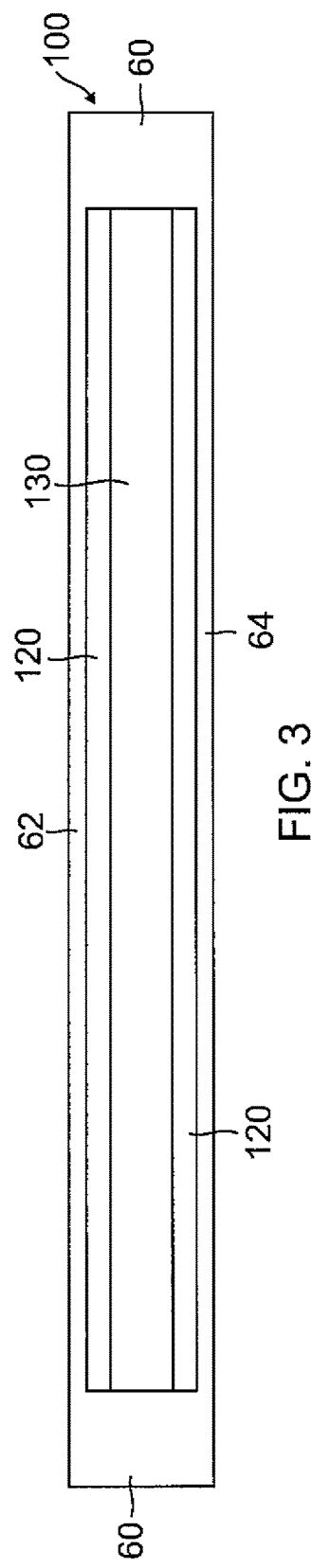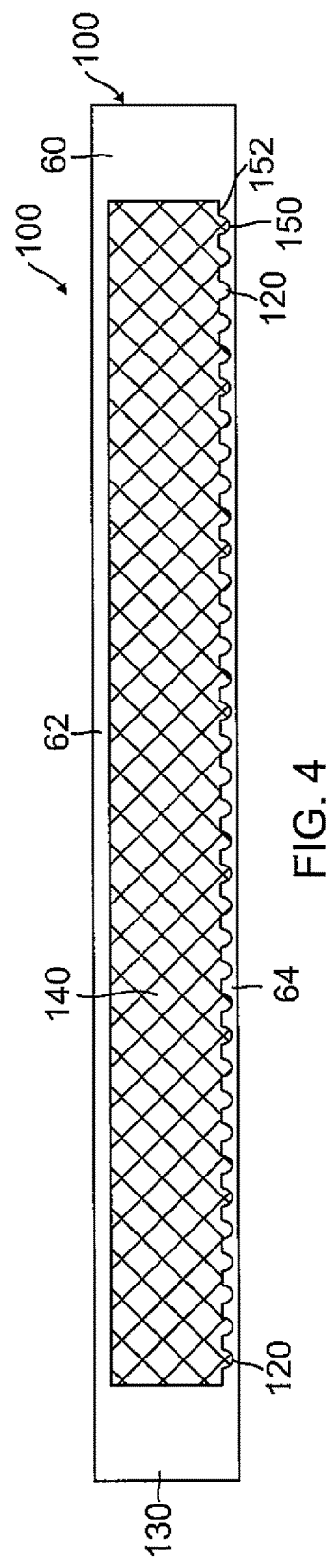

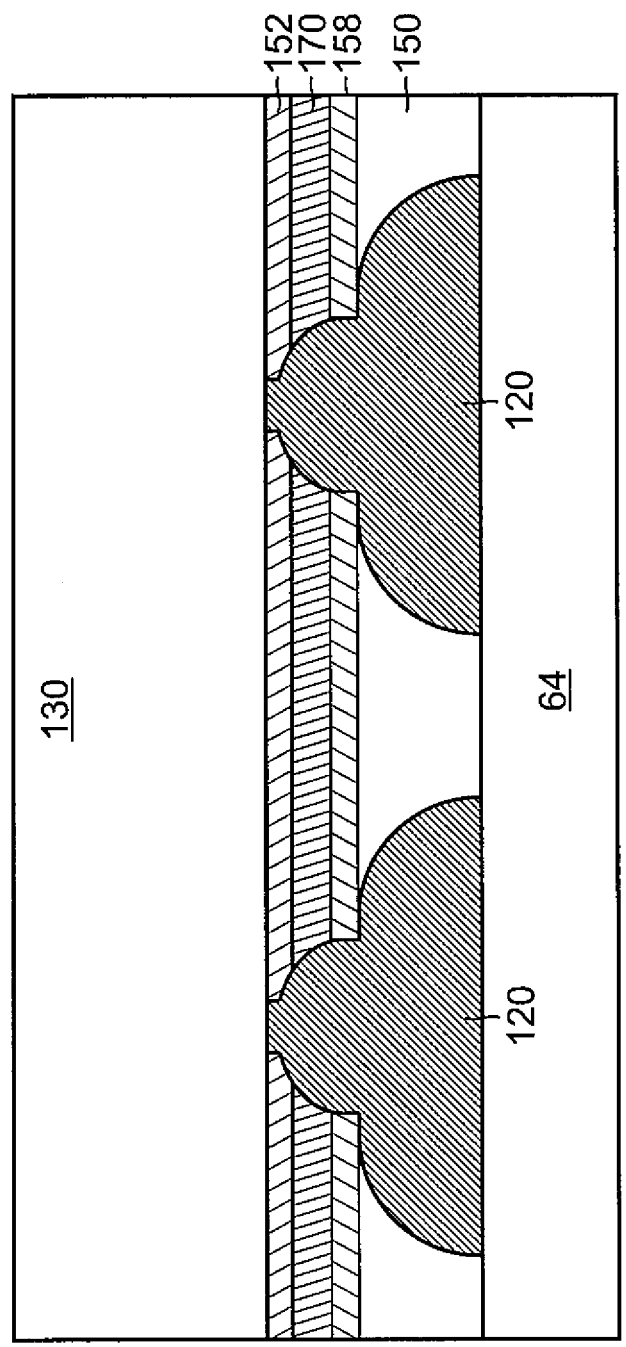

PLANAR HEAT PIPE WITH ARCHITECTED CORE AND VAPOR TOLERANT ARTERIAL WICK

CROSS-REFERENCE TO RELATED APPLICATION

This application claims priority to and the benefit of U.S. Provisional Application No. 61/801,638, filed on Mar. 15, 2013, the entire content of which is incorporated herein by reference.

FIELD

The present invention relates generally to planar heat pipes and a method of creating the same, and more particularly to a planar heat pipe having an architected core and a vapor tolerant arterial wick and a method of creating the same.

BACKGROUND

A heat pipe is a heat transfer mechanism that can transfer a large amount of heat with a very small temperature differential between its hot portion (or higher temperature region) and its cold portion (or lower temperature region). Inside a heat pipe, at the hot portion, a working fluid is evaporated into a vapor which then flows through a vapor region within the heat pipe and subsequently condenses at the cold portion into a liquid. The liquid is moved through a liquid region within the heat pipe (e.g., by gravity and/or capillary action) back to the hot portion to be evaporated again, creating a heat transfer cycle. Because heat pipes contain no mechanical moving parts, they typically require very little maintenance. In addition, as a heat transfer mechanism, a heat pipe has much higher efficiency in transferring heat, and is a much better heat conductor, than an equivalent solid metal block (or pipe).

In more detail, a typical heat pipe is composed of a sealed housing (or pipe), often made of a material with high thermal conductivity such as copper or aluminum. The sealed pipe is evacuated to form a vacuum, and then a portion of the pipe is filled with a working fluid (or coolant). Due to the pressure inside the heat pipe that is near or below the vapor pressure of the fluid, some of the working fluid will be in the liquid phase and some will be in the gas phase.

A wick structure may be included within the pipe walls to exert a capillary pressure on the liquid phase portion of the working fluid to wick the liquid back to the hot portion. Use of a wick structure within the heat pipe results in higher effective thermal conductivity than solid materials, alone, for example even good solid thermal conductors such as graphite, might allow. A typical wick structure may consist of a foam material having random cell configurations, a sintered particle bed, a wire mesh, or a set of grooves. The wick structure may also include a network of arteries (an arterial wick structure) having a network of arteries configured to wick the liquid back to the hot portion while reducing or minimizing pressure drops in the heat pipe. While these arterial wick structures are optimized for heat pipes requiring higher performance where, for example, the working fluid must travel a long distance between hot portion and cold portion or a large axial heat flux is imposed, known arterial wick structures often experience blockages caused by vapor bubbles. More specifically, vapor bubbles often form in the arteries of arterial wick structures, causing arterial function to cease and greatly reduce the maximum heat flux of the heat pipe.

Moreover, arterial wick structures are more commonly found in one-dimensional or tubular type heat pipes having a generally cored or circular cross-section. These one-dimensional heat pipes typically include adequate space to accommodate the network of arteries of an arterial wick structure such that the arteries can be separated a distance from the interior walls of the heat pipe. Separating the arteries from the possibly hotter interior walls is necessary for reducing or minimizing the occurrence of vapor bubbles in the arteries, and, thus, minimizing or preventing a possible reduction in maximum heat flux through the heat pipe caused by these vapor bubbles. However, these same arterial wick structures are not as easily accommodated in planar pipes—which typically utilize homogenous wicks or vapor chambers—with little to no space to separate out the arteries from the interior walls of the heat pipe. As such, the risk of vapor bubbles nucleating in the arteries of planar heat pipes is greatly increased.

Additional considerations must also be made in using planar rather than one-dimensional heat pipes. For example, while all heat pipes must be designed to withstand pressure differentials between the working fluid and ambient pressure, one-dimensional heat pipe design can be more readily adjusted to account for increases in pressure, for example, by thickening the interior wall of the heat pipe. This increased interior wall thickness to handle a given pressure in a one-dimensional pipe would result in a more negligible increase in the overall mass or weight of the heat pipe, owing to the cylindrical or tubular geometry of the one-dimensional heat pipe. In contrast, planar heat pipes, having a much higher wall area to total volume ratio and a larger surface area that must resist the pressure differential, experience a much more significant change in weight or mass resulting from a comparable interior wall thickness increase. To account for this less desirable weight or mass increase in planar pipes requiring additional pressure-resistibility, rather than increase the interior wall thickness or in combination with a smaller thickness increase, mechanical members may be placed spanning the vapor region of the heat pipe. These mechanical members may be configured to add structural integrity to the heat pipe, preventing or minimizing a collapse or burst in the heat pipe. Addition of mechanical members, however, increases pressure loss of the vapor, thus reducing maximum heat flux through these areas of the heat pipe.

As such, there is a need for a heat pipe configured to transport heat with higher effective thermal conductivities than solid materials can transport, to transport heat in planar form factors, and to transport heat at higher heat fluxes than currently available.

SUMMARY

Aspects of embodiments of the present invention relate generally to planar heat pipes and a method of creating the same, and more particularly to a planar heat pipe having an architected core and a vapor tolerant arterial wick and a method of creating the same. A heat pipe according to one or more embodiments of the present invention is configured to transport heat with higher effective thermal conductivities than solid materials can transport, to transport heat in planar form factors, and to transport heat at higher heat fluxes than homogenous wick planar heat pipes or vapor chambers. Aspects of embodiments of the present invention relate to a planar heat pipe structure with a micro-lattice core and an arterial wick and a method of creating the same, and more particularly to a planar heat pipe having an arterial wick structure integrated with a micro-lattice core.

According to an embodiment of the present invention, a planar heat pipe includes an arterial wick structure enabling venting or trapping of vapor bubbles which may occur in and otherwise block the artery, thus enabling higher heat fluxes than may be possible with known wick structure designs.

A heat pipe according to embodiments of the present invention may be configured to transport heat with a high effective thermal conductivity, for example, exceeding 3,000 Watts per meter-Kelvin (W/(mK)), in a planar form factor.

According to an embodiment, a planar heat pipe for transferring heat between a higher temperature region and a lower temperature region, the planar heat pipe may include a bottom facesheet, a top facesheet, a vapor venting arterial wick between the bottom facesheet and the top facesheet, the vapor venting arterial wick having a high permeability layer and a high capillary pressure layer, the high permeability layer and the high capillary pressure layer each having pores, wherein an average pore hydraulic diameter in the high permeability layer is greater than an average pore diameter in the high capillary pressure layer. The planar heat pipe may also include an architected mechanical core structure between the vapor venting arterial wick and the top facesheet, and a working fluid between the bottom facesheet and the top facesheet, wherein the architected mechanical core structure may include a vapor region, and the vapor venting arterial wick may include a liquid region.

In one embodiment, the architected mechanical core structure includes a micro-lattice layer, a micro-truss layer, ridges, and/or posts.

In one embodiment, a pore thickness and a pore diameter of a pore of the pores in the high capillary pressure layer, along with a height of the high permeability layer, a contact angle of the working fluid, and a surface tension of the working fluid may satisfy an inequality, $$D_p \geq \sqrt{\frac{\tau h}{\cos\theta}\left(2 - \frac{\tau\cos\theta}{h}\right)}$$

wherein $D_p$ is the pore diameter of the pore in the high capillary pressure layer, $\tau$ is the pore thickness of the pore in the high capillary pressure layer, h is the height of the high permeability layer, and $\theta$ is the contact angle of the working fluid in a liquid phase to a solid material of the high capillary pressure layer.

In one embodiment, the pores in the high capillary pressure layer may be non-circular, and $D_p$ may be equal to an inverse of a mean of the inverses of a major and a minor diameter of the pores in the high capillary pressure layer.

In one embodiment, the height of the high permeability layer may be measured from a lower surface of the high capillary pressure layer through the liquid region.

In one embodiment, the height of the high permeability layer may be measured from a surface directly below the pore diameter of the pore in the high capillary pressure layer through the liquid region.

In one embodiment, a pore thickness and a pore diameter of a pore of the pores in the high capillary pressure layer, along with a height of the high permeability layer, a contact angle of the working fluid, and a surface tension of the working fluid may satisfy an inequality, wherein $D_p$ is the pore diameter of the pore in the high capillary pressure layer, $D_a$ is the height of the high permeability layer, $\psi$ is the contact angle of the working fluid in a liquid phase to a solid material in the high capillary pressure layer, $\delta$ is the pore thickness of the pore in the high capillary pressure layer, $\sigma$=is the surface tension of the working fluid, and $(P_{vs}-P_l)$ is a pressure difference between a vapor and a liquid in the planar heat pipe, and wherein $\overline{D}_p = D_p \cos\psi/D_a$, $\overline{S} = (P_{vs}-P_l)/(4\sigma \cos\psi/D_a)$, and $\overline{\delta} = \delta \cos\psi/D_a$.

In one embodiment, the bottom facesheet may include mechanical posts spaced at intervals corresponding with the pores in the high permeability layer such that the spacing between posts defines a pore hydraulic diameter in the high permeability layer and a height of the posts defines a thickness, and wherein the high permeability layer is below the high capillary pressure layer in the liquid region, and the pore hydraulic diameter may satisfy an equation 4*[(Wetted Area)/(Liquid Volume)].

In one embodiment, the architected mechanical core structure of the vapor region and the mechanical posts of the liquid region may at least partially align and may include at least one point of contact such that the architected mechanical core structure and the mechanical posts are coupled at this at least one point of contact.

In one embodiment, the architected mechanical core structure may include a three-dimensional micro-lattice structure.

In one embodiment, the architected mechanical core structure may include straight posts configured to align with the mechanical posts of the liquid region.

In one embodiment, the high capillary pressure layer may define a top perimeter of the liquid region, and a top surface of the high capillary pressure layer may include, in-part, a liquid-vapor interface between the liquid region and the vapor region of the planar heat pipe.

In one embodiment, the mechanical posts of the bottom facesheet, may be integral with the bottom facesheet such that the bottom facesheet is patterned.

According to an embodiment, a planar heat pipe for transferring heat between a higher temperature region and a lower temperature region may include a bottom facesheet, a top facesheet, an arterial wick between the bottom facesheet and the top facesheet, an architected mechanical core structure between the arterial wick and the top facesheet, and a working fluid between the bottom facesheet and the top facesheet. The architected mechanical core structure may include a vapor region, and the arterial wick may include a liquid region. The bottom facesheet may include mechanical posts spaced at intervals in the liquid region, and the arterial wick may further include porous layers positioned between the mechanical posts and having a height at least equal to a height of the mechanical posts such that segmented regions are defined between every four sets of posts configured to trap vapor bubbles in the liquid region within respective segmented regions.

According to an embodiment, a heat pipe for transferring heat between a higher temperature region and a lower temperature region may include a bottom facesheet, a top facesheet, and a hierarchical vapor venting arterial wick between the bottom facesheet and the top facesheet, the hierarchical vapor venting arterial wick having a high permeability layer with at least one high permeability sub-layer and a high capillary pressure layer with at least two high capillary pressure sub-layers. One of the at least two high capillary pressure sub-layers may be a middle high capillary pressure sub-layer between the high permeability layer and another one of the at least two high capillary pressure sub-layers may be a top high capillary pressure sub-layer, and the high permeability sub-layers and the high capillary pressure sub-layers each may include pores, wherein an average pore hydraulic diameter in the high permeability sub-layer may be greater than an average pore diameter in the high capillary pressure sub-layer, and wherein an average pore diameter in the middle high capillary pressure sub-layer may be greater than the pore diameter of a largest pore in the high capillary pressure sub-layer and less than the average pore hydraulic diameter in the high permeability sub-layer.

In one embodiment, the heat pipe may further include an architected mechanical core structure between the hierarchical vapor venting arterial wick and the top facesheet, and a working fluid between the bottom facesheet and the top facesheet, wherein the bottom facesheet includes mechanical posts spaced at intervals corresponding with the pores in the high permeability layer such that the spacing between posts defines a pore hydraulic diameter in the high permeability layer and a height of the posts defines a thickness. The high permeability layer may be below the high capillary pressure layer in a liquid region of the heat pipe. The architected mechanical core structure may include a vapor region, and the hierarchical vapor venting arterial wick may include a liquid region.

In one embodiment, a pore thickness and a pore diameter of a pore of the pores in the high capillary pressure sub-layer and the middle high capillary pressure sub-layer, along with a height of the high permeability layer, a contact angle of a working fluid in the heat pipe, and a surface tension of the working fluid may satisfy inequalities, $$D_{p,1} \geq \sqrt{\frac{\tau_1 h_1}{\cos\theta}\left(2 - \frac{\tau_1 \cos\theta}{h_1}\right)},$$

$$D_{p,2} \geq \sqrt{\frac{\tau_2 h_{2,eff}}{\cos\theta}\left(2 - \frac{\tau_2 \cos\theta}{h_{2,eff}}\right)},$$

and $$h_{2,eff} = h_2 + \frac{D_{p,2}}{2}(\sec\theta - \tan\theta),$$

wherein $D_{p,2}$ is the pore diameter of the high capillary pressure sub-layer, $\tau_2$ is the pore thickness of the pore in the high capillary pressure sub-layer, $h_2$ is a distance between the high capillary pressure sub-layer and the middle high capillary pressure sub-layer, $D_{p,1}$ is the pore diameter of the middle high capillary pressure sub-layer, $\tau_1$ is a distance between the bottom of the middle high capillary pressure sub-layer and a top of the high capillary pressure sub-layer, $h_1$ is a height of the high permeability sub-layer, and $\theta$ is the contact angle of the working fluid in a liquid phase to a solid material of the high capillary pressure sub-layer.

In one embodiment, a pore thickness and a pore diameter of a pore of the pores in the high capillary pressure sub-layer and the middle high capillary pressure sub-layer, along with a height of the high permeability sub-layer, a contact angle of a working fluid in the heat pipe, and a surface tension of the working fluid may satisfy a set of inequalities, $$\left[1 - \sqrt{1 - \overline{D}_{p,1}^2} + \left[1 - \sqrt{1 - (\overline{S}_1 \overline{D}_{p,1})^2}\right]\right]/\overline{S}_1 \geq 2\overline{\delta}_1,$$

wherein $\overline{D}_{p,1} = D_{p,1} \cos\psi/D_{a,1}$, $\overline{S}_1 = (P_{vs} - P_l)/(4\sigma \cos\psi/D_{a,1})$, and $\overline{\delta}_1 = \delta_1 \cos\psi/D_{a,1}$, and wherein $$\left[1 - \sqrt{1 - \overline{D}_{p,2}^2} + \left[1 - \sqrt{1 - (\overline{S}_2 \overline{D}_{p,2})^2}\right]\right]/\overline{S}_2 \geq 2\overline{\delta}_2,$$

$\overline{D}_{p,2} = D_{p,2} \cos\psi/D_{a,2}$, $\overline{S}_2 = (P_{vs} - P_l)/(4\sigma \cos\psi/D_{a,2})$, $\overline{\delta}_2 = \delta_2 \cos\psi/D_{a,2}$, and $$D_{a2,eff} = D_{a2} + \frac{D_{p,2}}{2}(\sec\psi - \tan\psi),$$

wherein $D_{p,1}$ is the pore diameter of the pore in the middle high capillary pressure sub-layer, $D_{a,1}$ is a is a height of the high permeability sub-layer, $\psi$ is the contact angle of the working fluid in a liquid phase to a solid material of the high capillary pressure sub-layer, $\delta_1$ is a distance between a bottom of the middle high capillary pressure sub-layer and a top of the high capillary pressure sub-layer, $\sigma$ is a surface tension of the working fluid, $(P_{vs}-P_l)$ is a pressure difference between a vapor and a liquid in the heat pipe, $D_{p,2}$ is the pore diameter of the pore in the high capillary pressure sub-layer, $D_{a,2}$ is a distance between the high capillary pressure sub-layer and the middle high capillary pressure sub-layer, and, $\delta_2$ is the pore thickness of the pore in the high capillary pressure sub-layer.

In one embodiment, the heat pipe may further include a spacer in between the at least two high capillary pressure layers, the spacer being configured to structurally support a top-most high capillary pressure sub-layer.

In one embodiment, the hierarchical vapor venting arterial wick may be configured to vent vapor bubbles forming in a liquid region of the heat pipe first through the high permeability layer having a larger average pore hydraulic diameter to the middle high capillary pressure sub-layer, and then from the middle high capillary pressure sub-layer to the top high capillary pressure sub-layer such that the pore diameter and thickness of the pores at each layer and a height of each layer and each spacer layer are sized such that the vapor bubbles can be vented by opening a vapor path from the vapor bubble to a vapor region and having a liquid-vapor interface recede from within the liquid region up to and through a top-most high capillary pressure sub-layer.

According to an embodiment, a method of forming a planar heat pipe for transferring heat between a higher temperature region and a lower temperature region may include forming a bottom facesheet, patterning the bottom facesheet to define a high permeability layer, forming a high capillary pressure layer, wherein forming the high capillary pressure layer may include defining an array of pores in the high capillary pressure layer; forming an architected mechanical core structure, forming a frame, the frame including at least one fill tube, forming a top facesheet to face the bottom facesheet; and bonding the top facesheet, the architected mechanical core structure, the frame, and the bottom facesheet.

In one embodiment, the high capillary pressure layer may include at least one vapor-venting pore and the forming of the high capillary pressure layer may include adding holes or pores to a metal foil, graphite, or graphene by electroplating through a mask or through three-dimensional (3D) printing, removing holes or pores from the metal foil by chemical etching, plasma etching, electrochemical etching, laser machining, mechanical machining, vapor deposition comprising sputtering, and/or or vapor deposition comprising evaporation with a photoresist lift-off process; forming a woven wire mesh; or forming an electroplated mesh.

In one embodiment, the forming of the high capillary pressure layer includes forming at least two high capillary pressure layers.

In one embodiment, the forming of the high capillary pressure layer includes defining an array of pores in a metal foil, wherein a pore thickness and a pore diameter of a pore of the pores in the high capillary pressure layer, along with a height of the high permeability layer, a contact angle of the working fluid, and a surface tension of the working fluid may satisfy an inequality, $$D_p \geq \sqrt{\frac{\tau h}{\cos\theta}\left(2 - \frac{\tau\cos\theta}{h}\right)}$$

wherein $D_p$ is the pore diameter of the pore in the high capillary pressure layer, $\tau$ is the pore thickness of the pore in the high capillary pressure layer, h is a height of the high permeability layer, and $\theta$ is the contact angle of the working fluid in a liquid phase to a solid material of the high capillary pressure layer.

In one embodiment, the forming of the high capillary pressure layer may include defining an array of pores in a metal foil, wherein a pore thickness and a pore diameter of a pore of the pores in the high capillary pressure layer, along with a height of the high permeability layer, a contact angle of the working fluid, and a surface tension of the working fluid may satisfy an inequality, $$1 - \sqrt{1 - \overline{D_p^2}} + \left[1 - \sqrt{1 - (\overline{SD_p})^2}\right]/\overline{S} \geq 2\overline{\delta},$$

wherein $D_p$ is the pore diameter of the pore in the high capillary pressure layer, $D_a$ is a is a height of the high permeability layer, $\psi$ is the contact angle of the working fluid in a liquid phase to a solid material of the high capillary pressure layer, $\delta$ is the pore thickness of the pore in the high capillary pressure layer, $\sigma$=is the surface tension of the working fluid, and $(P_{vs}-P_l)$ is a pressure difference between a vapor and a liquid in the heat pipe, wherein, $\overline{D_p}=D_p \cos\psi/D_a$, $\overline{S}=(P_{vs}-P_l)/(4\sigma \cos\psi/D_a)$, and $\overline{\delta}=\delta \cos\psi/D_a$.

In one embodiment, the forming of the architected mechanical core structure may include forming a patterned post structure by etching, mechanical machining such as milling, laser cutting, and/or electrochemical etching the top facesheet.

In one embodiment, the method may further include testing the planar heat pipe by filling a fill tube with a working liquid and temporarily sealing the planar heat pipe, adjusting a volume of the working liquid based on the testing, and permanently sealing the fill tube of the planar heat pipe.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 1 is a perspective view illustrating a planar heat pipe according to an embodiment of the present invention.

FIG. 2 is a cross-sectional view of a planar heat pipe having one liquid region, according to an embodiment.

FIG. 3 is a cross-sectional view of a planar heat pipe having two liquid regions, according to another embodiment.

FIG. 4 is a cross-sectional view of a planar heat pipe having one liquid region and a vapor region with a micro-lattice core, according to an embodiment.

FIG. 16 is a schematic cross-sectional diagram of a heat pipe having a hierarchical arterial wick structure and a spacer layer for improved mechanical structure, according to an embodiment.

DETAILED DESCRIPTION

Figure 5:
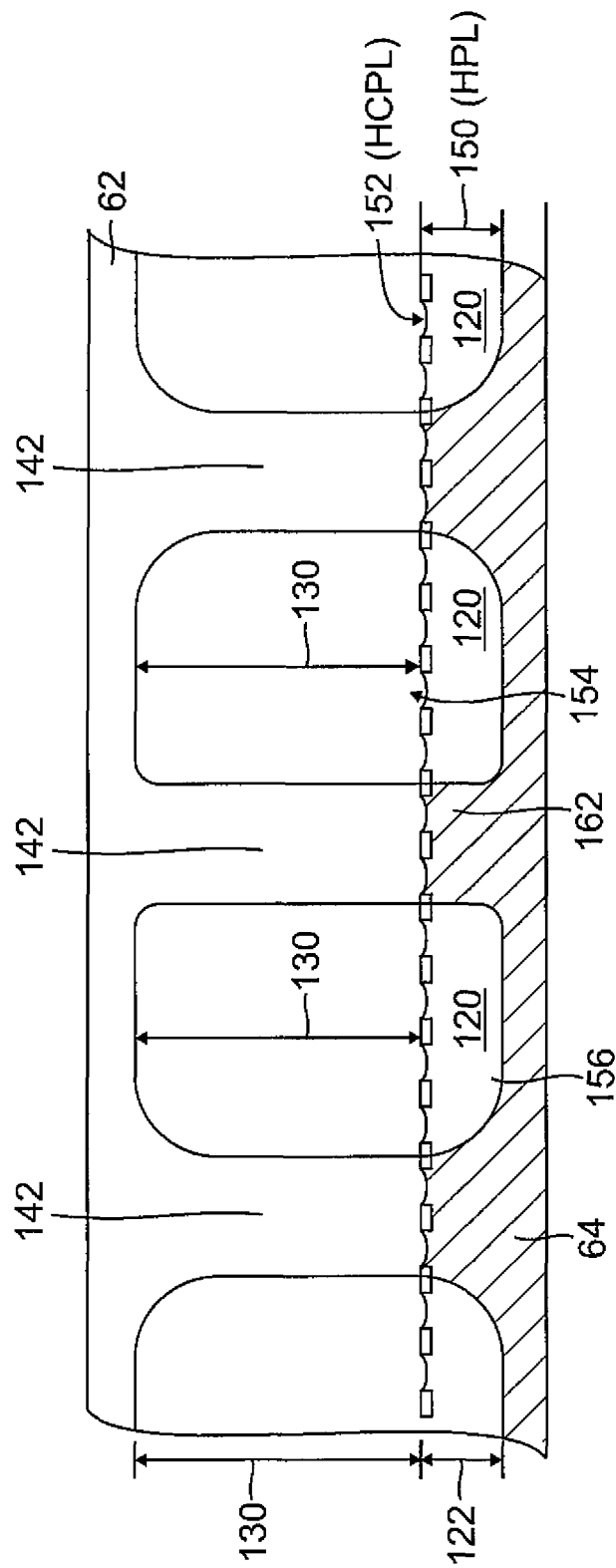
FIG. 5 is a cross-sectional view of a planar heat pipe having one liquid region and a vapor region with a straight-post structure, according to an embodiment.

The detailed description set forth below in connection with the accompanying drawings is intended as a description of embodiments of a planar heat pipe with architected core and vapor tolerant arterial wick, as provided in accordance with the present invention, and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A heat pipe 100 according to an embodiment of the present invention will be described with reference to FIGS. 1 and 2, in which FIG. 1 is a perspective view illustrating the planar heat pipe 100 according to an embodiment, and FIG. 2 is a cross-sectional view of the planar heat pipe 100 according to an embodiment, the heat pipe 100 having one liquid region 120 and one vapor region 130. The heat pipe 100, according to an embodiment, includes an evaporator region 10 at its hot portion (or higher temperature region) and a condenser region 20 at its cold portion (or lower temperature region), with an adiabatic region 30 defined between the evaporator region 10 and the condenser region 20, as shown in FIG. 1. Though the evaporator region 10 and the condenser region 20 are shown in respective positions of the heat pipe 100 in FIG. 1, the locations of these regions 10 and 20 are not necessarily fixed. The evaporator region 10 of the heat pipe 100 according to an embodiment is configured to evaporate a fluid in the heat pipe 100 from a liquid to a vapor, as indicated by the arrows in FIG. 2. The condenser region 20 is configured to condense this evaporated liquid (or vapor) back to a liquid and return to the evaporator region 10 in the heat pipe 100, as indicated by the arrows in FIG. 2.

The various elements constituting the heat pipe 100 according to the embodiments of the present invention are preferably fabricated from one homogenous material in order to prevent or minimize corrosion and heat pipe 100 degradation over time, the material being any suitable material known in the art for use with heat pipes 100. The working fluid used or utilized in the heat pipe 100 according to embodiments of the present invention may be any suitable fluid known in the art for this type of application, including, water, alcohols, hydrocarbons, halogenated hydrocarbons, gases near cryogenic temperatures, ammonia, molten/vaporized metals, metals/vaporized salts, etc., and/or an azeotrope of multiple fluids. The working fluid, according to embodiments of the present invention, should be a fluid that will not solvate any of the components of the heat pipe 100 system in order to prevent a reduced life of the heat pipe 100 through dissolution and redeposition of the dissolved species during the evaporation-condensation cycle of the working fluid within the heat pipe 100.

The heat pipe 100 according to an embodiment includes a heat pipe enclosure 50. The heat pipe enclosure 50, according to this embodiment, has a planar shape such that a thickness t of the heat pipe enclosure 50 is significantly smaller in size than the other two dimensions, i.e., a length L and a width W of the heat pipe enclosure 50. In one embodiment, the length L and the width W of the heat pipe enclosure 50 are each five times the thickness t of the heat pipe enclosure 50. In one embodiment, the length L and/or the width W of the heat pipe enclosure 50 is ten times the thickness t of the heat pipe enclosure 50. In one embodiment, the thickness t of the heat pipe enclosure 50 is less than 5 millimeters (mm), and in an embodiment, approximately (about) 1 mm to approximately (about) 3 mm in thickness.

The heat pipe enclosure 50 of the heat pipe 100 according to an embodiment, as shown in FIG. 2, includes two facesheets 62 and 64, a top facesheet 62 and a bottom facesheet 64 extending in the length and width directions of the heat pipe enclosure 50. The heat pipe enclosure 50, according to an embodiment, also includes a frame 60 extending in a direction along the thickness t of the heat pipe enclosure 50. The frame 60, according to an embodiment, extends along a perimeter of the heat pipe enclosure 50, coupled with the top and bottom facesheets 62 and 64 along the perimeter of the heat pipe enclosure 50. In one embodiment, at least one of the facesheets 62 and/or 64 is formed integrally with the frame 60. In another embodiment, the facesheets 62 and 64 are separately formed and then joined to the frame 60, for example by epoxy, brazing, soldering, welding, ultrasonic welding, etc. In these embodiments, whether the frame 60 and the facesheets 62 and 64 are integrally formed or later coupled/joined, the coupled connection is vacuum tight. The evaporator region 10 and the condenser region 20 are included in the heat pipe enclosure 50, as indicated in the embodiments shown in FIGS. 1 and 2.

As shown in the embodiment of FIG. 1, the heat pipe enclosure 50 of the heat pipe 100 includes one or more filling ports 40. The filling ports 40, according to an embodiment, are configured to introduce and remove cleaning solutions into the heat pipe 100. According to another embodiment, the filling ports 40 may be configured to evacuate any gases, including noncondensable gases, from the heat pipe 100 prior to filling the heat pipe 100 for use. In another embodiment, the filling ports 40 may be configured for introducing the working fluid into the heat pipe 100. During use, according to an embodiment of the present invention, the filling port 40 is temporarily sealed (e.g. with a valve) before initial testing of the heat pipe 100, wherein the amount of working fluid filled in the heat pipe 100 can be adjusted. In this embodiment, after testing, the filling port 40 may be permanently sealed (e.g., by welding, crimping and cold welding, etc.) to set the working fluid level and finalize the heat pipe 100 operation.

With continued reference to FIGS. 1 and 2, and with reference to the embodiment in FIG. 3 including a cross-sectional view of the planar heat pipe 100 having two liquid regions 120, and the embodiment in FIG. 4 including a cross-sectional view of the planar heat pipe 100 having one liquid region 120 and a vapor region 130 with a micro-lattice core 140, the heat pipe 100, according to these embodiments, includes at least one liquid region 120 and at least one vapor region 130. The one or more liquid regions 120 inside the heat pipe 100 include a wick or wick structure 122 (hereinafter used interchangeably), as shown in FIG. 5, and are configured to transport the working fluid from near the condenser region 20 to the evaporator region 10 of the heat pipe 100. In an embodiment, the one or more liquid regions 120 are adjacent to one or both facesheets 62 and 64. In some embodiments, the evaporator region 10 and the condenser region 20 are on the same facesheet 62 or 64, and in these embodiments, the heat pipe 100 may have only one liquid region 120, and the liquid region 120 is adjacent to the facesheet 62 or 64 where the evaporator region 10 is located. In an embodiment, as shown in FIG. 3 for example, the heat pipe 100 may include one vapor region 130 sandwiched between two liquid regions 120 between the top and bottom facesheets 62 and 64. In another embodiment, one or more liquid regions 120 may be separated from the facesheets 62 and 64 by one or more vapor regions 130.

Figure 14:
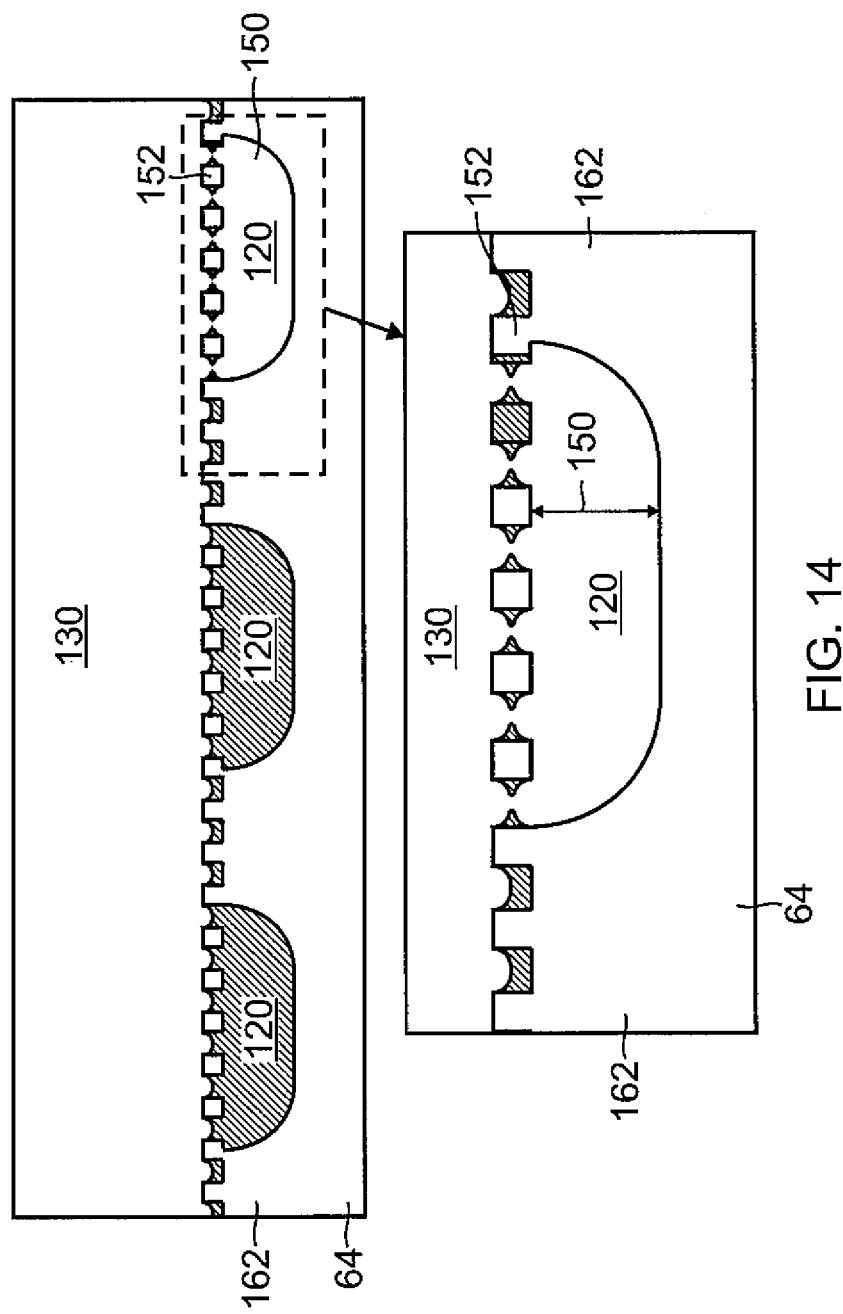
FIG. 14 is a schematic diagram illustrating the process of vapor bubble venting in a heat pipe having a single-layer arterial wick structure, according to an embodiment.

With continued reference to FIG. 4 and with reference to the embodiment shown in FIG. 5, showing a cross-sectional view of the planar heat pipe 100 having one liquid region 120 and a vapor region 130 with a straight-post structure 142, the liquid regions 120 of the planar heat pipe 100 include the arterial wick structure 122. In an embodiment, the arterial wick structure 122 may include standard arterial wicks 122 including a high permeability layer (HPL) 150 and a high capillary pressure layer (HCPL) 152, as shown in FIG. 14, illustrating a schematic diagram of a vapor bubble venting process in a heat pipe 100 according to an embodiment having a single-layer arterial wick structure 122. The HPL 150, according to an embodiment, has a low resistance to flow. Accordingly, the HPL 150 according to an embodiment has a large average pore 156 size suitable for high permeability and low pressure loss of the working fluid (i.e., enabling a high heat flux). In an embodiment, the HPL 150 has an average pore 156 size ranging from approximately (about) 100 micrometers (μm) to approximately (about) 2,000 μm, and in one embodiment, the HPL 150 has an average pore 156 size ranging from approximately (about) 300 μm to approximately (about) 1,000 μm. The pores 156 of the HPL 150 according to an embodiment range in size. In an embodiment, walls constituting the HPL 150, and especially walls adjacent to the evaporator region 10, have a low surface roughness configured to inhibit nucleation of vapor bubbles in the arteries 152 by increasing the wall superheat required to nucleate a vapor bubble. In an embodiment, the size of the pores 156 of the HPL 150 may be determined by the spacing of mechanical members or posts 162 in the bottom facesheet 64 or liquid region 120 that extend in a thickness direction of the layer liquid region 120.

The HCPL 152, according to an embodiment, has a high resistance to flow or low permeability, and may be positioned adjacent to the vapor region 130 of the planar heat pipe 100 (i.e., at the boundary of the liquid region 120 and the vapor region 130). Accordingly, the HCPL 152 according to an embodiment has a small maximum pore 154 size suitable high capillary pressure. In an embodiment, the HCPL 152 has a maximum pore 154 size ranging from approximately (about) 1 nanometer (nm) to approximately (about) 300 micrometers (μm), and in one embodiment, the HCPL 152 has a maximum pore 154 size ranging from approximately (about) 100 nm to 200 μm and a smaller pore 154 size than the average size of the HPL 150 pores 156. The pores 154 of the HCPL 152 according to an embodiment can range in size. At least one of the pores 154 in these embodiments is a vapor-venting pore 154. A vapor venting pore 154 of the HCPL 152 according to an embodiment of the present invention is configured to prevent the formation of a liquid bridge across the pore 154, thus resulting in the arterial wick structure 122 being "vapor tolerant." In known arterial networks where the pore size allows for the formation of a liquid bridge, vapor bubbles formed in the arterial network become trapped at the pore, resulting in capillary pressure of the arterial network to be governed by the maximum pore size of the HPL rather than the maximum pore of the HCPL. The result would be a reduction in the maximum heat flux of the heat pipe.

Accordingly, embodiments of the present invention allow for the size of the at least one vapor-venting pore 154 to be calculated using a set of equations derived from the following references, which are incorporated herein by reference, adjusting for use with planar heat pipes 100 (rather than one-dimensional or other shapes and types or kinds of heat pipes demonstrated): J. E. Eninger, *Priming Foils for Venting Noncondensable Gas from Heat-Pipe Arteries*, Heat Transfer With Thermal Control Applications, American Institute of Aeronautics and Astronautics (1975) at 235-243; Tarik Kaya and Konstantin Goncharov, *Investigation of the Thermal Performance Characteristics of a Variable Conductance Arterial Heat Pipe*, Frontiers in Heat Pipes (FHP), 2, 013004 (2011), Thermal Fluids Central Journal; and J. E. Eninger, *Menisci Coalescence As a Mechanism for Venting Noncondensable Gas from Heat-Pipe Arteries*, American Institute of Aeronautics and Astronautics and American Society of Mechanical Engineers, Thermophysics and Heat Transfer Conference Jul. 15-17, 1975. In order for an arterial wick 122, according to embodiments of the present invention (for example as shown in FIG. 14), to adequately vent vapor bubbles formed in the heat pipe 100 such that the functionality, pressure, and permeability of the fluid flow in the heat pipe 100 remains optimized with minimum to no interruptions in flow, the diameter $D_P$ of the at least one vapor-venting pore 154 of the HCPL 152 must satisfy the following equation:

$$\left[1 - \sqrt{1 - \overline{D}_p^2} + \left[1 - \sqrt{1 - (\overline{S}\overline{D}_p)^2}\right]\right]/\overline{S} \geq 2\overline{\delta}, \text{ where } D_a =$$

distance from bottom of liquid region 120 mechanical members (i.e., short posts or short ridges 162) in a patterned facesheet 62, 64 to the high capillary pressure layer 152 (i.e., a height of the HPL 150), ψ=contact angle between the working fluid liquid to the wick 122 material, $D_p$=vapor-venting pore 154 diameter high capillary pressure layer 152, δ=thickness of vapor-venting pore 154 diameter $D_p$ in high capillary pressure layer 152, and σ=surface tension of the working fluid, $(P_{vs}-P_l)$ is the pressure difference between the vapor and liquid, and the following equations must also be satisfied, $$\overline{D}_p = D_p \cos \psi/D_a,$$

$$\overline{S} = (P_{vs}-P_l)/(4\sigma \cos \psi/D_a), \text{ and}$$

$$\overline{\delta} = \delta \cos \psi/D_a.$$

In other embodiments of the present invention, the diameter $D_P$ of the at least one vapor-venting pore 154 of the HCPL 152 may be determined using (utilizing) the following inequality by Kaya and Goncharov:

$$D_p \geq \sqrt{\frac{\tau h}{\cos \theta}\left(2 - \frac{\tau \cos \theta}{h}\right)},$$

where $h=D_a$, $\tau=\delta$, and $\theta=\psi$.

Figure 12:
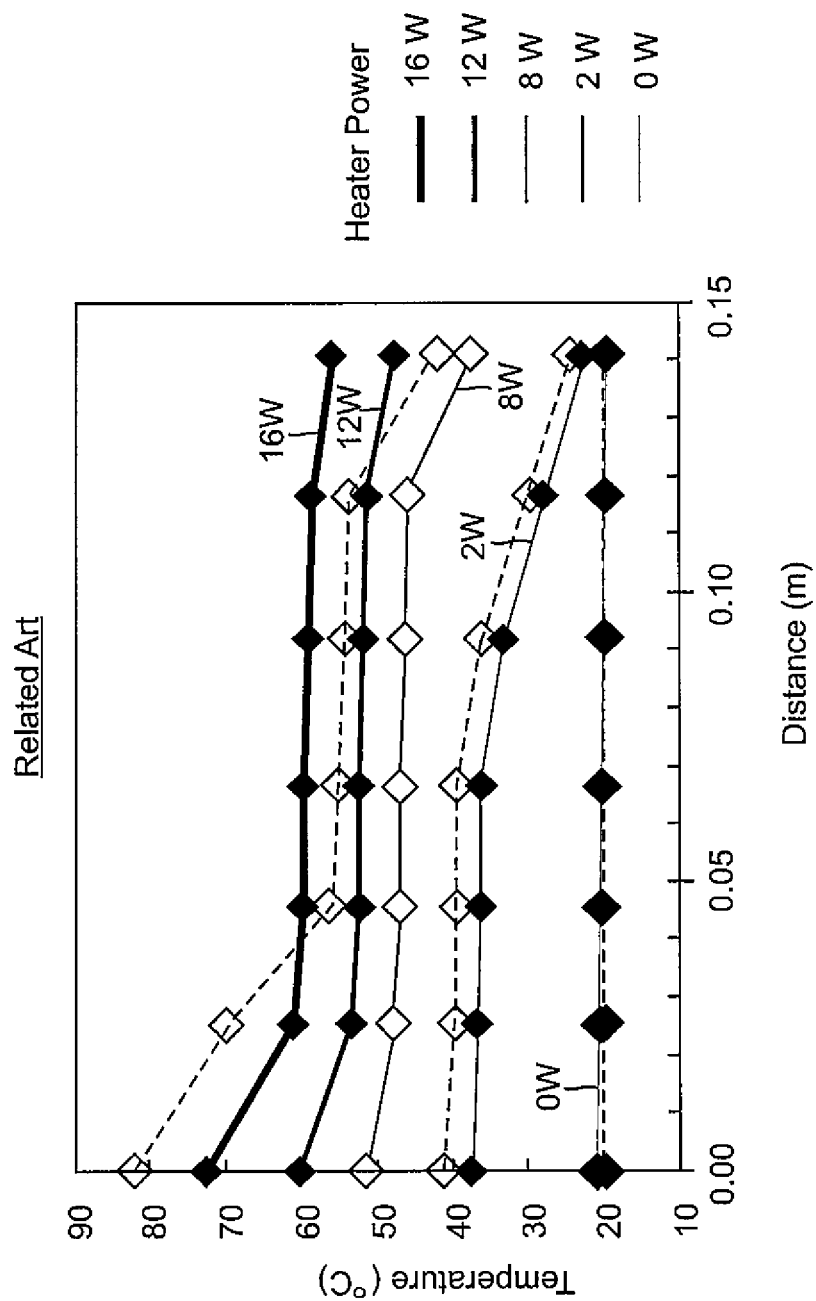
FIG. 12 is a graph illustrating the heat power performance of a planar heat pipe with an arterial wick without a vapor venting feature, according to known arterial wick construction of related art.
Figure 13:
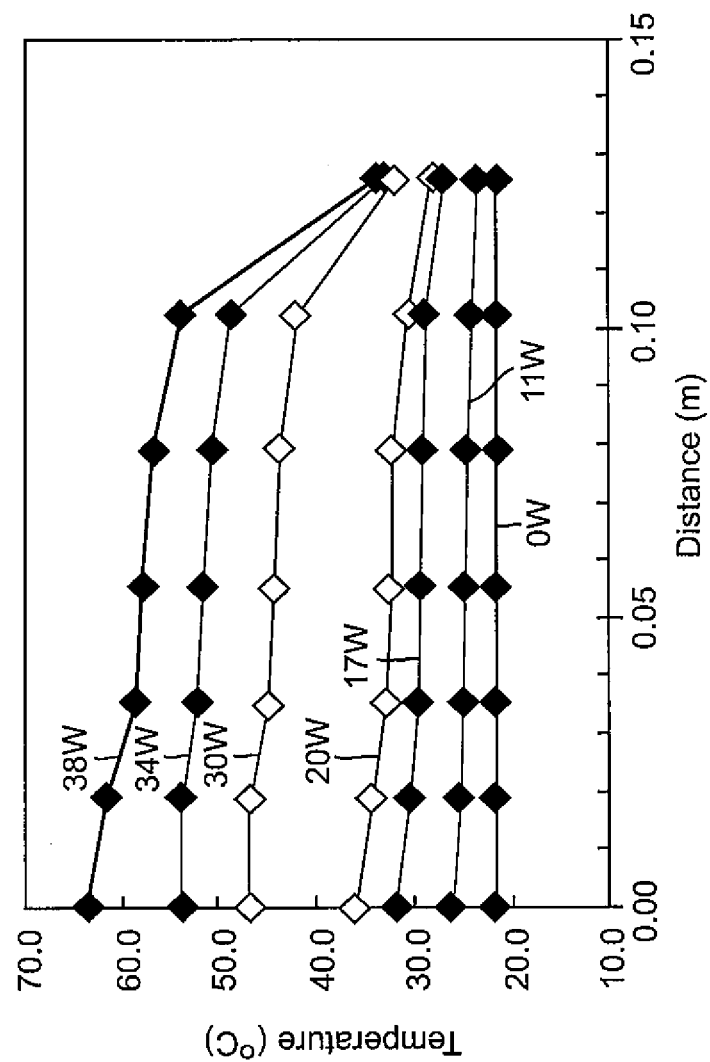
FIG. 13 is a graph illustrating the heat power performance of a planar heat pipe with an arterial wick with a vapor venting feature according to embodiments of the present invention.

A comparison between FIG. 12, a graph illustrating the heat power performance of a planar heat pipe with an arterial wick without a vapor venting feature, according to known arterial wick construction of related art, and FIG. 13, a graph illustrating the heat power performance of a planar heat pipe 100 with an arterial wick 122 with a vapor venting feature (or pore 154) according to embodiments of the present invention, shows the increased heat power performance of the planar heat pipe 100 with arterial wick 122 having a vapor venting feature (for example the pore 154) according to the embodiments in the present invention. As shown in FIG. 13 (as compared with FIG. 12), at similar temperatures over the same distance in the arterial wick structure 122 according to embodiments of the present invention having a vapor venting feature (for example the vapor-venting pore 154), there is a noticeable increase in heat power performance of the heat pipe 100 due to the inclusion of the vapor venting feature in embodiments of the present invention. In FIG. 13, up to about 38 W of power can be applied to the heat pipe before experiencing a "dry-out" (defined below), as compared with the 12 W "dry-out" in FIG. 12. In FIG. 12, a much finer pore or capillary size (2,000 pore/inch) in the arterial wick 122 was used, while in FIG. 13, 200 pores/inch were used, thus, the two graphs are not directly comparable (the heat pipe in FIG. 12 has a finer, higher quality pore distribution). Regardless of these differences, the heat pipe in FIG. 13, with a pore size/distribution ten times "worse" or less refined than the heat pipe in FIG. 12 still out-performed the heat pipe in FIG. 12 by a factor of at least three.

The x-axis of each of these graphs corresponds to a distance along the heat pipe with the evaporator region on the left side of the x-axis and the condenser region on the right side of the x-axis, and the y-axis corresponds to temperature. An ideal heat pipe provides a perfectly flat profile (or as flat as possible) at as high of a power as possible. With heat pipes, generally, increasing power results in an increasing movement of the working fluid inside the heat pipe, and greater pressure drop required to move the liquid with an increase in formation of vapor. Eventually, with increasing power, the liquid is no longer able to make its way back to the evaporator region of the heat pipe, a phenomenon referred to as "dry-out," which is evidenced at the 8 W mark indicated in FIG. 12, and further evidenced at the 12 W mark, and so forth (an increase in the slope at the evaporator side of the heat pipe (closer to x=0.0) is indicative of dry-out). The limit of power in the heat pipe is indicated on the graph as the region where the slope of the power line has a sharp increase near the evaporator region. The condenser regions of FIGS. 12 and 13 also show a sharp change in the slope of the lines of the graphs. The change in slope near the condenser regions is usually indicative of heat pipe overfilling. In these examples, the heat pipes are intentionally overfilled for testing, to minimize time for adjusting filling levels.

Figure 6:
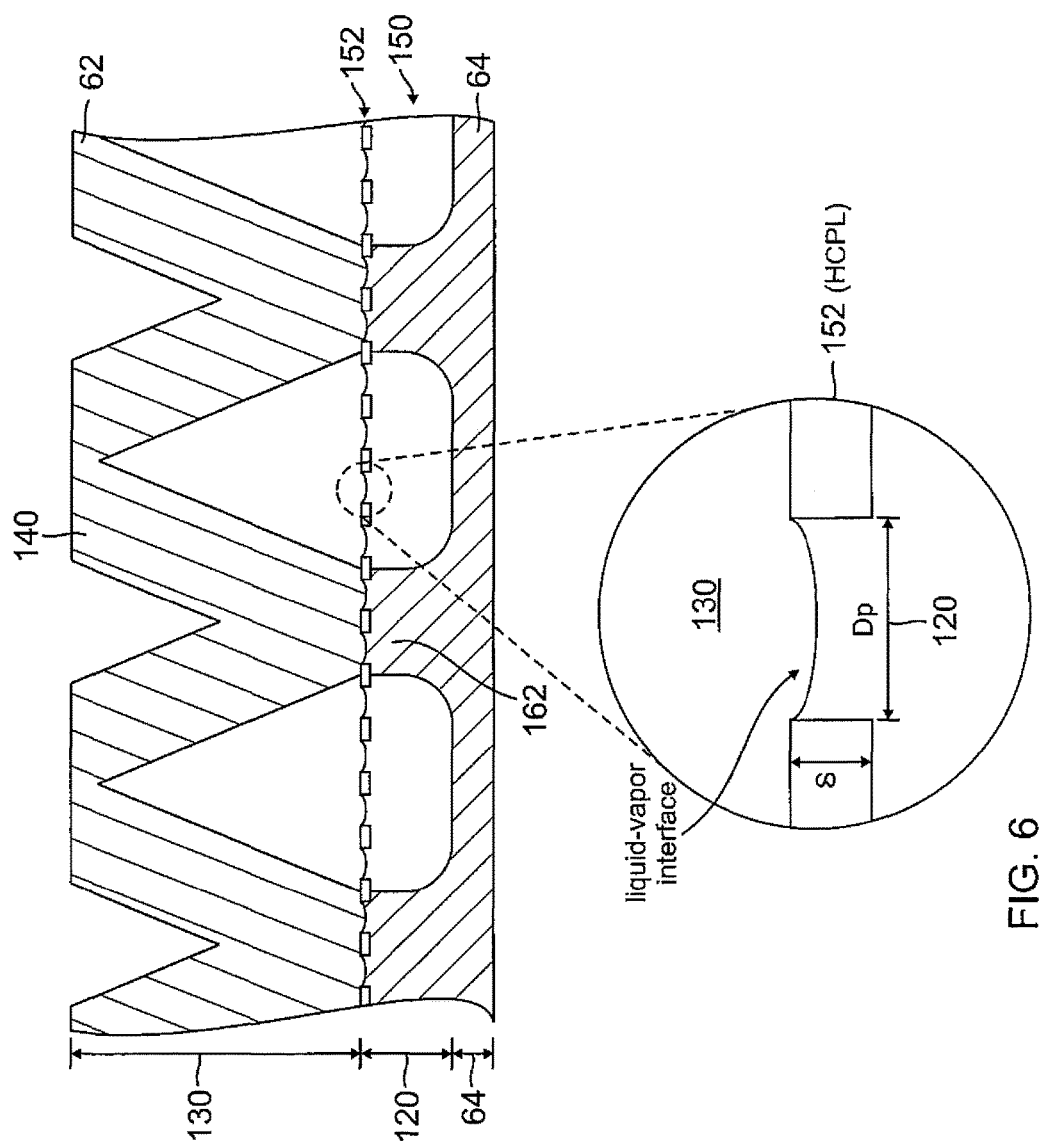
FIG. 6 is a cross-sectional view including an enlarged view of a portion of a planar heat pipe having one liquid region and a vapor region with a micro-lattice post structure.
Figure 7:
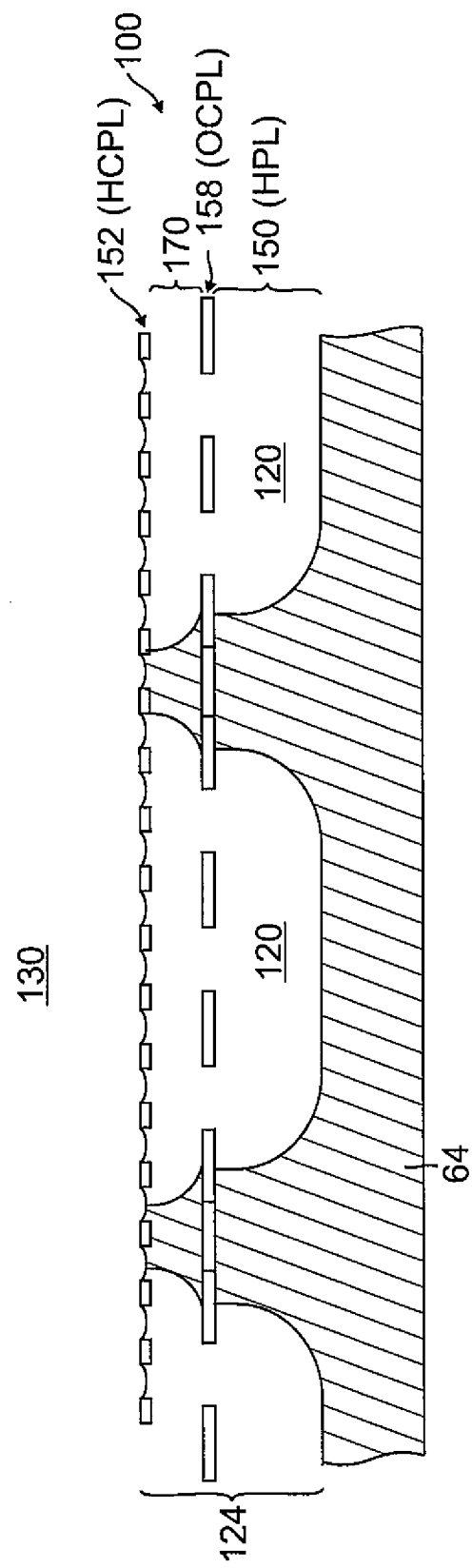
FIG. 7 is a cross-sectional view of a portion of a partial planar heat pipe having a hierarchical vapor venting arterial wick structure within the liquid region.

With reference now to FIG. 7, a cross-sectional view of a partial planar heat pipe 100 having a hierarchical vapor venting arterial wick structure 124 within the liquid region 120, according to an embodiment of the present invention, is shown. According to this embodiment, a hierarchical arterial wick structure 124 may include at least one high permeability layer 150 and at least two high capillary pressure layers 152. In this embodiment, the HCPL 152 layer closest to the vapor region 130 within the heat pipe 100 is a higher capillary pressure layer than the other high capillary pressure layer(s) 158 (hereinafter "other capillary pressure layer(s)" or "OCPL"), such that the capillary pressure increases in a direction from the HPL 150 to the at least one OCPL 158 to the HCPL 152 moving through the liquid region 120 toward the vapor region 130. In some embodiments, the hierarchical arterial wick structure 124 also includes a spacer layer 170 between each of the HCPL 152 and OCPL 158 layers (as shown in FIG. 16, for example). In a heat pipe 100 according to these embodiments having a hierarchical arterial wick structure 124, the HCPL 152 would be configured to operate as a wick, where the liquid-vapor interface would lie at this layer (i.e., where the liquid region 120 ends and the vapor region 130 begins at the HCPL 152 surface; shown in FIG. 6). In embodiments including the spacer layer 170, the dimensions of the spacer layer are configured to prevent trapping liquid menisci between the OCPL 158 and HCPL 152 layers. A heat pipe 100 according to these embodiments enables use of higher capillary pressure layers 152 paired with higher permeability layers 150 than might otherwise be possible with known single layer heat pipes, resulting in increased heat pipe 100 performance due to this hierarchical vapor tolerant arterial wick structure 124. FIG. 16 shows a schematic cross-sectional diagram of the heat pipe 100 embodiment having this hierarchical arterial wick structure 124 and the spacer layer 170 for improved mechanical structure, as described above. As shown in FIG. 16, the spacer layer 170, which is configured to add mechanical and structure support or stiffness to the heat pipe 100 structure at the liquid region 120 is between the OCPL 158 and HCPL 152 layers, tapering at each of the pores in these respective layers such that the liquid-vapor interface is unaffected by the spacer layer 170. The spacer layer 170, according to embodiments of the present invention, may be formed of the same material as the various components of the heat pipe 100, or may be any compatible material known or appreciated in the art and suitable for use in a heat pipe 100 in order to provide an improved mechanical structure.

Figure 15:
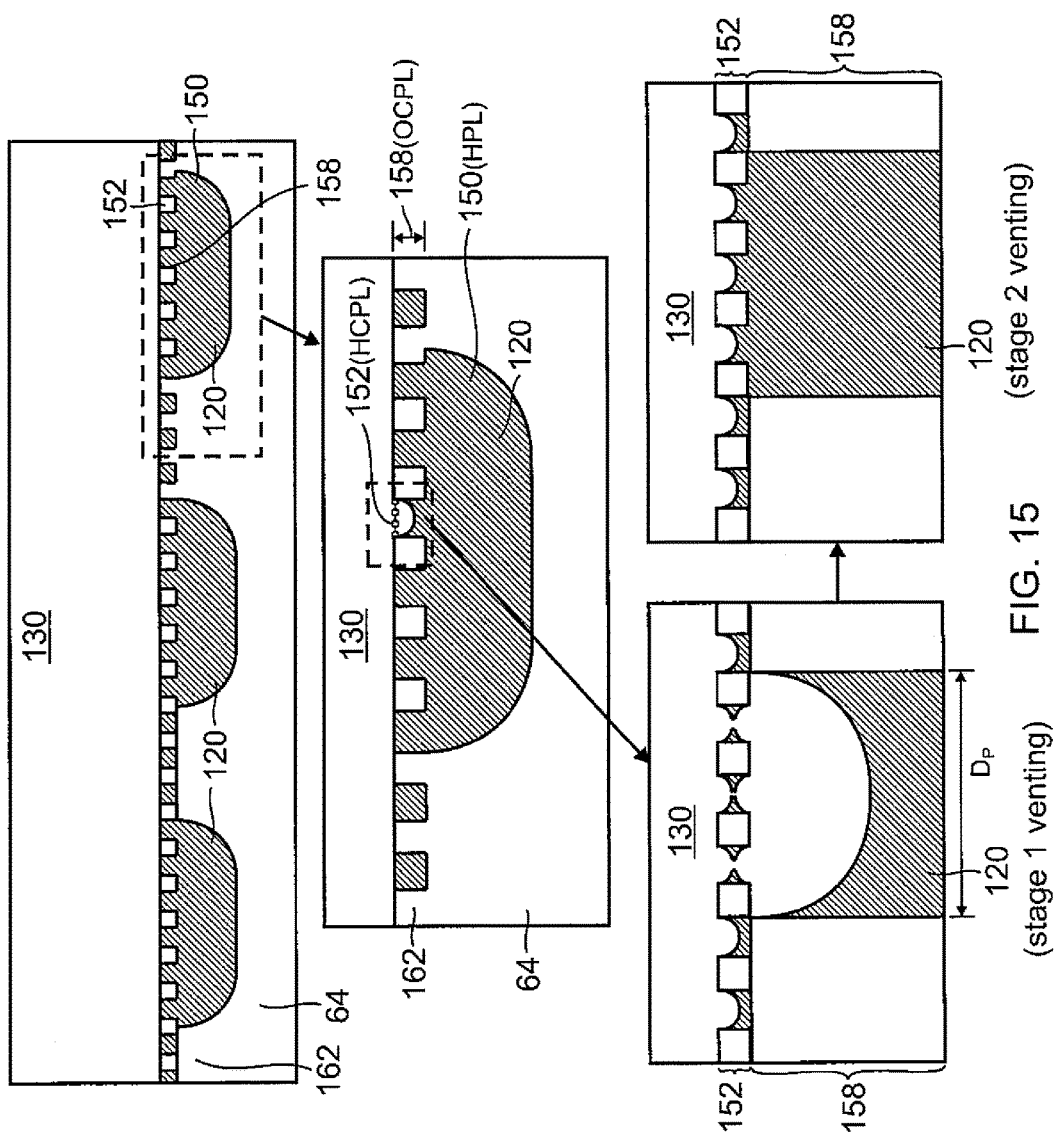
FIG. 15 is a schematic diagram illustrating the process of vapor bubble venting in a heat pipe having a hierarchical arterial wick structure, according to an embodiment.

In an embodiment where the heat pipe 100 includes a two-layer hierarchical arterial wick structure 124 having one HCPL 152 and one OCPL 158 layer in addition to the HPL 150 layer, vapor bubble venting during operation of the heat pipe 100 would proceed such that the liquid-vapor interface would first progress from the HPL 150 toward the lower of the two capillary pressure layers (i.e., the OCPL 158) and then to the highest capillary pressure layer 152, thus venting in a two-step process. FIG. 15 is a schematic diagram illustrating this process of vapor bubble venting in the heat pipe 100 embodiment having this two-layer hierarchical arterial wick structure 124. In an embodiment where the heat pipe 100 includes three or more layers within the hierarchical arterial wick structure 124, vapor bubble venting during operation of the heat pipe 100 would proceed such that the bubbles would vent through the layer closest to the HPL 150 first, and then proceed to venting through all the layers until the highest permeability layer 150 was reached, finally progressing from this highest HPL 150 toward the lowest of the capillary pressure layers (i.e., the OCPL 158) and then to the highest capillary pressure layer 152, thus venting in a multi-step process.

In the embodiment in FIG. 15, for example, a two-stage venting process (hierarchical vapor venting process) is shown, wherein a vapor bubble is first formed in the high permeability layer 150, and the vapor bubble vents through this HPL 150 with the liquid-vapor meniscus moving up toward the other capillary pressure layer 158. After venting through the OCPL 158, the vapor bubble may be smaller in size than it was when traveling through the HPL 150, which has larger pores 156 than the OCPL 158. However, at this point in the venting process, the liquid-vapor meniscus is not quite up to the highest capillary pressure layer 152. Accordingly, the pores of the HCPL 152, based on embodiments of the present invention, should be sized using (utilizing) the channel size or pore diameter $D_P$ of the other capillary pressure layer 158, rather than that of the HCPL 152, itself, while all other variables are taken from the features of the HCPL 152 and used (utilized) in the formulas above, in accounting for the second vapor venting step. As such, the vapor bubble can be vented and the liquid-vapor meniscus can be brought up to the highest capillary pressure layer 152, according to embodiments of the present invention. Similar substitutions and sizing considerations can be made for heat pipes 100 having three or more layers in their hierarchical arterial wick structures 124.

In embodiments including the hierarchical arterial wick structure 124, in order for the arterial wick 124 to adequately vent vapor bubbles formed in the heat pipe 100 such that the functionality, pressure, and permeability of the fluid flow in the heat pipe 100 remains optimized with minimum to no interruptions in flow, the diameter $D_P$ of the at least one vapor-venting pore 154 of the HCPL 152 must satisfy the following equations:

$$1 - \sqrt{1 - \overline{D}_{p,1}^2} + \left[1 - \sqrt{1 - (\overline{S}_1 \overline{D}_{p,1})^2}\right] / \overline{S}_1 \geq 2\overline{\delta}_1$$

where, $\overline{D}_{p,1} = D_{p,1} \cos \psi / D_{a,1}$, $\overline{S}_1 = (P_{vs} - P_l)/(4\sigma \cos \psi / D_{a,1})$, and $\overline{\delta}_1 = \delta_1 \cos \psi / D_{a,1}$, and where $$1 - \sqrt{1 - \overline{D}_{p,2}^2} + \left[1 - \sqrt{1 - (\overline{S}_2 \overline{D}_{p,2})^2}\right] / \overline{S}_2 \geq 2\overline{\delta}_2,$$

$\overline{D}_{p,2} = D_{p,2} \cos \psi / D_{a,2}$, $\overline{S}_2 = (P_{vs} - P_l)/(4\sigma \cos \psi / D_{a,2})$, $\overline{\delta}_2 = \delta_2 \cos \psi / D_{a,2}$, and $$D_{a2,eff} = D_{a2} + \frac{D_{p,2}}{2}(\sec\psi - \tan\psi),$$

where $D_{p,1}$ is the pore diameter of the pore in the OCPL 158, $D_{a,1}$ is a is the height of the HPL 150, $\psi$ is the contact angle of the working fluid liquid phase to the high capillary pressure layer 152 solid material, $\delta_1$ is the distance between the bottom of the OCPL 158 and the top of the HCPL 152, $\sigma$ is the surface tension of the working fluid, $(P_{vs}-P_l)$ is the pressure difference between the vapor and liquid, $D_{p,2}$ is the pore diameter of the pore in the HCPL 152, $D_{a,2}$ is the distance between the HCPL 152 and the OCPL 158, and, $\delta_2$ is the pore thickness of the pore in the HCPL 152. In other embodiments of the present invention, the diameter $D_P$ of the at least one vapor-venting pore 154 of the HCPL 152 may be determined using (utilizing) the following inequalities by Kaya and Goncharov, adjusted for the hierarchical arterial wick structure 124:

$$D_{p,1} \geq \sqrt{\frac{\tau_1 h_1}{\cos\theta}\left(2 - \frac{\tau_1 \cos\theta}{h_1}\right)},$$

and $$D_{p,2} \geq \sqrt{\frac{\tau_2 h_{2,eff}}{\cos\theta}\left(2 - \frac{\tau_2 \cos\theta}{h_{2,eff}}\right)},$$

where $$h_{2,eff} = h_2 + \frac{D_{p,2}}{2}(\sec\theta - \tan\theta),$$

and where $D_{p,2}$ is the pore diameter of the HCPL 152, $\tau_2$ is the pore thickness of the pore in the HCPL 152, $h_2$ is the distance between the HCPL 152 and the OCPL 158, $D_{p,1}$ is the pore diameter of the OCPL 158, $\tau_1$ is the distance between the bottom of the OCPL 158 and the top of the HCPL 152, $h_1$ is the height of the HPL 159, and $\theta$ is the contact angle of the working fluid liquid phase to the high capillary pressure layer 152 solid material.

Figure 8:
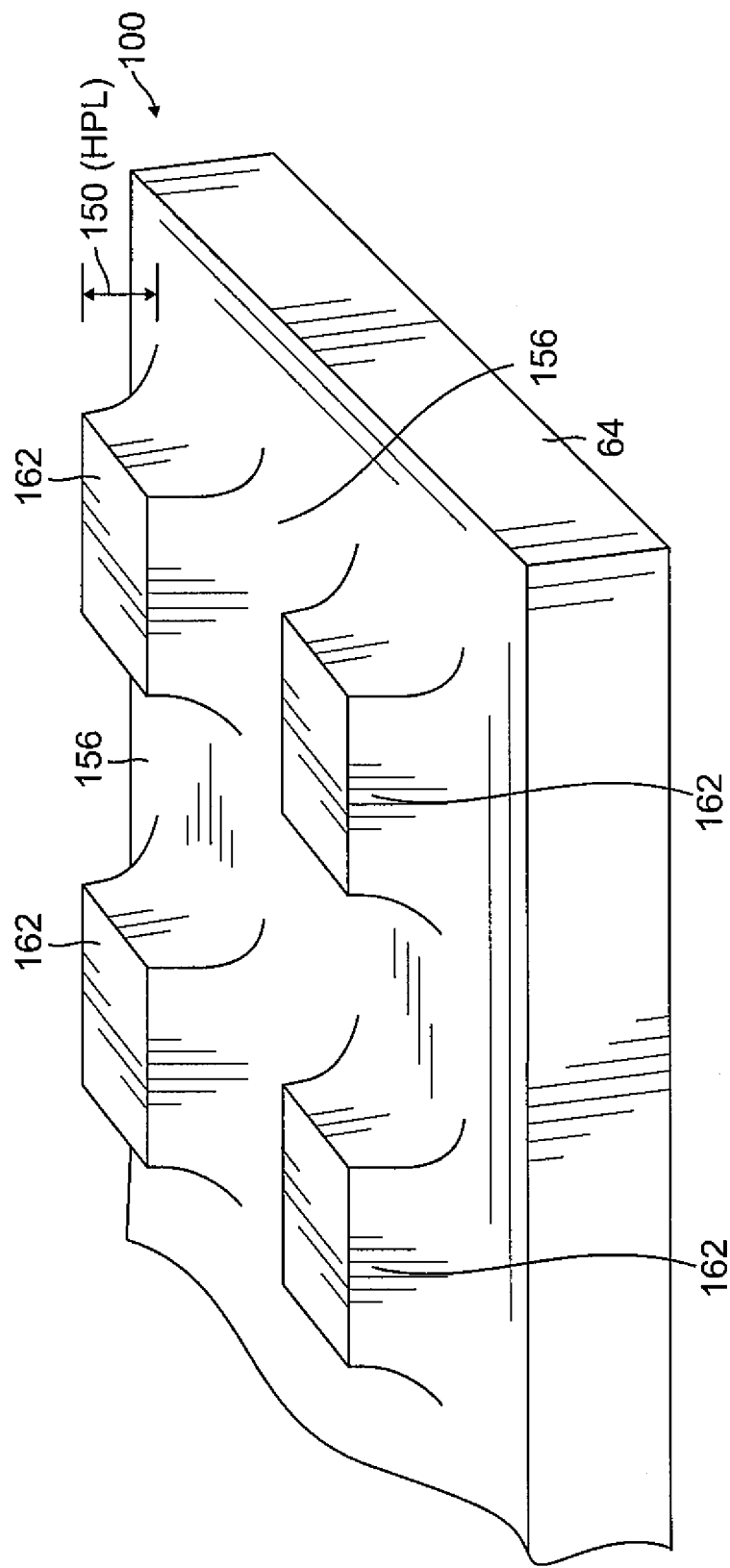
FIG. 8 is a perspective view of a partial patterned facesheet of a planar heat pipe having short posts, according to an embodiment.

With reference back to FIG. 5, with reference to FIG. 6 illustrating a cross-sectional view including an enlarged view of the planar heat pipe 100 having one liquid region 120 and a vapor region 130 with a micro-lattice post structure 140, and with reference to FIG. 8 showing a perspective view of a partial patterned facesheet 64 of the planar heat pipe 100 having short posts 162, the liquid region(s) 120 of the heat pipe 100 according to embodiments of the present invention may include mechanical members 162, such as posts, that extend in a thickness-direction of the heat pipe 100. Moreover, the vapor region(s) 130 of the heat pipe 100 may also include mechanical members (i.e., an architected core) such as posts 142 (as shown in FIG. 5), or a micro-lattice structure 140 (as shown in FIG. 6), for example, that extend in a thickness-direction of the heat pipe 100. This area may also be referred to as the "core" or "architected core" of the heat pipe 100, and the term "core" may be used interchangeably with the vapor region 130 and its mechanical members such as posts 142 or micro-lattice/micro-truss structure 140. According to embodiments of the present invention, the mechanical members 162 of the liquid region 120 and the posts 142 or micro-lattice/micro-truss structure 140 of the vapor region 130 may align such that these members can be coupled or joined to each other at the points of alignment. In embodiments where the mechanical members 162 of the liquid region 120 and the posts 142 or micro-lattice/micro-truss structure 140 of the vapor region 130 are coupled, the coupling can be according to any technique known in the art, for example via epoxy, soldering, brazing, welding, etc. In an embodiment, the mechanical members 162 of the liquid region 120 are aligned with the posts 142 or micro-lattice/micro-truss structure 140 of the vapor region 130. In another embodiment, the mechanical members 162 of the liquid region 120 and the posts 142 or micro-lattice/micro-truss structure 140 of the vapor region 130 are not aligned, or are only partially aligned, such that only a fraction of the liquid region 120 mechanical members 162 can be coupled to or connected to the posts 142 or micro-lattice/micro-truss structure 140 of the vapor region 130.

As shown in FIGS. 5, 6, and 8, for example, in some embodiments, the high permeability layer 150 is defined by the structure of the mechanical members or posts 162 in the liquid region 120, such that the pores 156 of the HPL 150 are defined by the area in the facesheet 64 between posts 162 in the liquid region 120 (as shown in FIG. 8). In embodiments, for example in the embodiment shown in FIG. 6, where the vapor region 130 includes a micro-lattice or micro-truss 140, methods of manufacturing the micro-lattice or micro-truss 140 and methods of coupling the micro-lattice or micro-truss 140, can be performed as described in U.S. Pat. No. 8,453,717 B1 to Roper et al., incorporated herein, in its entirety, by reference. Additional disclosure on the manufacture and use of the micro-lattice or micro-truss structure 140 according to embodiments of this invention can be found in U.S. Pat. No. 8,579,018 B1 to Roper et al., also incorporated herein, in its entirety, by reference. However, the embodiments of the present invention are not limited to the disclosures in these references. The micro-lattice/micro-truss structure 140, as shown in the embodiment of FIG. 6, for example, enables a mechanically efficient structure with optimal tradeoff between closely spaced mechanical members for thin, light-weight walls and large, aligned passages for low pressure loss vapor flow.

The mechanical members 162 of the liquid region 120 and the mechanical members 140 or 142 of the vapor region. 130 are configured to withstand mechanical and structure loads place on the heat pipe 100 due to pressure differentials during operation between, heating and cooling operations, and the weight of the heat pipe 100, itself. As such, mechanical members 162, 142, and/or 140 are configured to limit deformation of the heat pipe 100 via the facesheets 62 and 64 and frame 60 to prevent or limit the possibility of a collapse of the heat pipe enclosure 50 when a pressure outside the heat pipe 100 is greater than the pressure inside the heat pipe 100, for example when evacuating the heat pipe 100 prior to filling with working fluid. Moreover, in these embodiments, the mechanical members 162, 142, and/or 140 are also configured to prevent or limit deformation of the heat pipe 100 via the facesheets 62 and 64 and frame 60 to prevent or limit the possibility of the heat pipe enclosure 50 bursting when the pressure inside the heat pipe 100 is greater than the pressure outside the heat pipe 100, for example when operating the heat pipe 100 and the vapor pressure of the working fluid is greater than the ambient pressure outside the heat pipe enclosure 50. In embodiments including mechanical members 162 in the liquid region 120, and mechanical members 142 or 140 in the vapor region 130 (i.e., in embodiments including an architected core), the overall thickness t of the frame and facehseets 60, 62, and 64 of the heat pipe 100 can be reduced, allowing for manufacturing lighter heat pipes 100, and/or heat pipes 100 spanning a larger overall surface area with a reduced overall weight.

According to one or more embodiments of the present invention, the vapor region 130 of the heat pipe 100 has high porosity in order to permit vapor flow and high permeability vapor flow in the region. In one embodiment, the porosity of the vapor region 130 ranges from approximately (about) 0.99 to approximately (about) 0.50, and in another embodiment, the porosity ranges from approximately (about) 0.95 to approximately (about) 0.75. In embodiments where the vapor region 130 includes mechanical members such as posts 142 or a micro-lattice/micro-truss 140, these mechanical members 142 or 140 should have a minimal effect on the pressure loss or flow of vapor through the vapor region 130 (i.e., should only negligibly affect the high porosity of this region). In an embodiment, for example as shown in FIG. 6, where the mechanical member is a micro-lattice 140, the micro-lattice 140 is a three-dimensional micro-lattice 140 having a network of solid lattice members connected at a plurality of nodes. Each node in the micro-lattice 140 according to this embodiment has symmetry such as rotational symmetry, mirror symmetry, or inversion symmetry, and the symmetry group can vary for different nodes. In one embodiment, the node group symmetry may be $D_{4h}$. The lattice members of the micro-lattice 140 according to this embodiment can be solid, hollow, or have a solid core with conformal coating.

Figure 9:
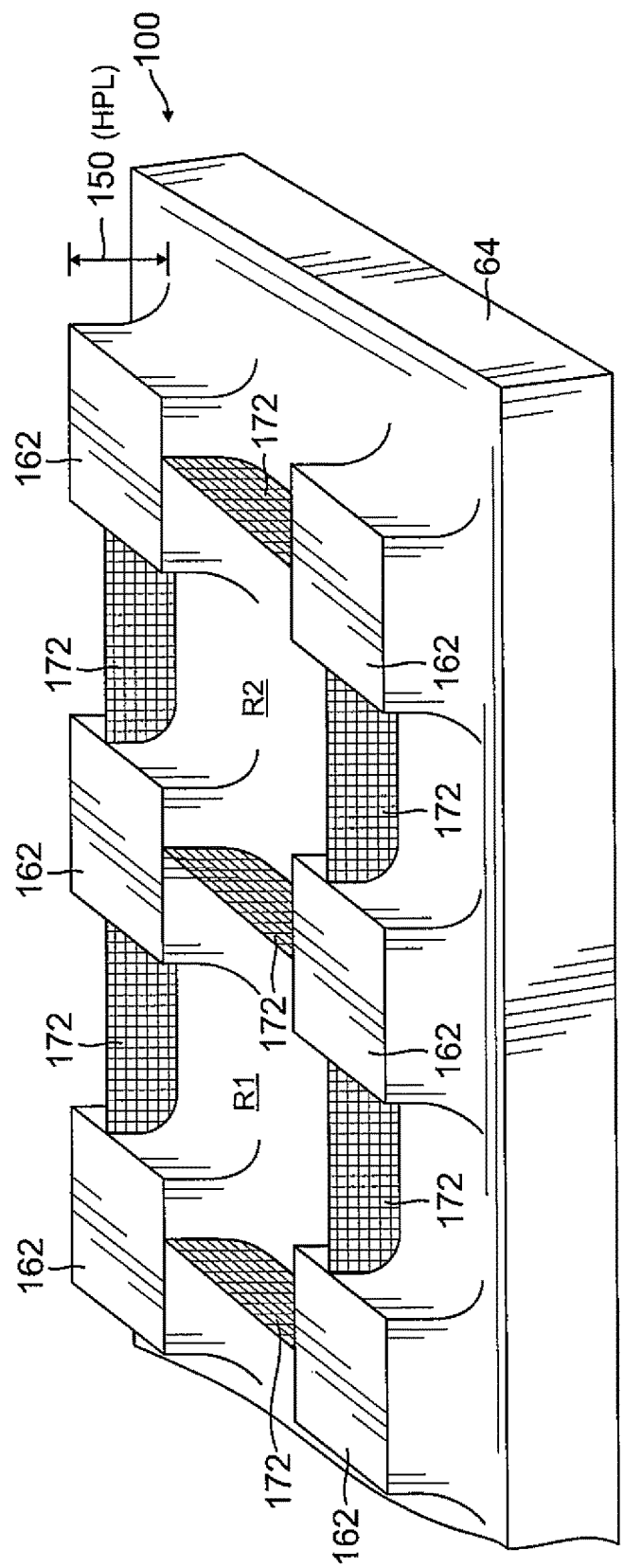
FIG. 9 is a perspective view of the partial patterned facesheet of FIG. 8 including porous layers placed between posts to create segmented regions in a highly permeable layer of the arterial wick, according to another embodiment.
Figure 10:
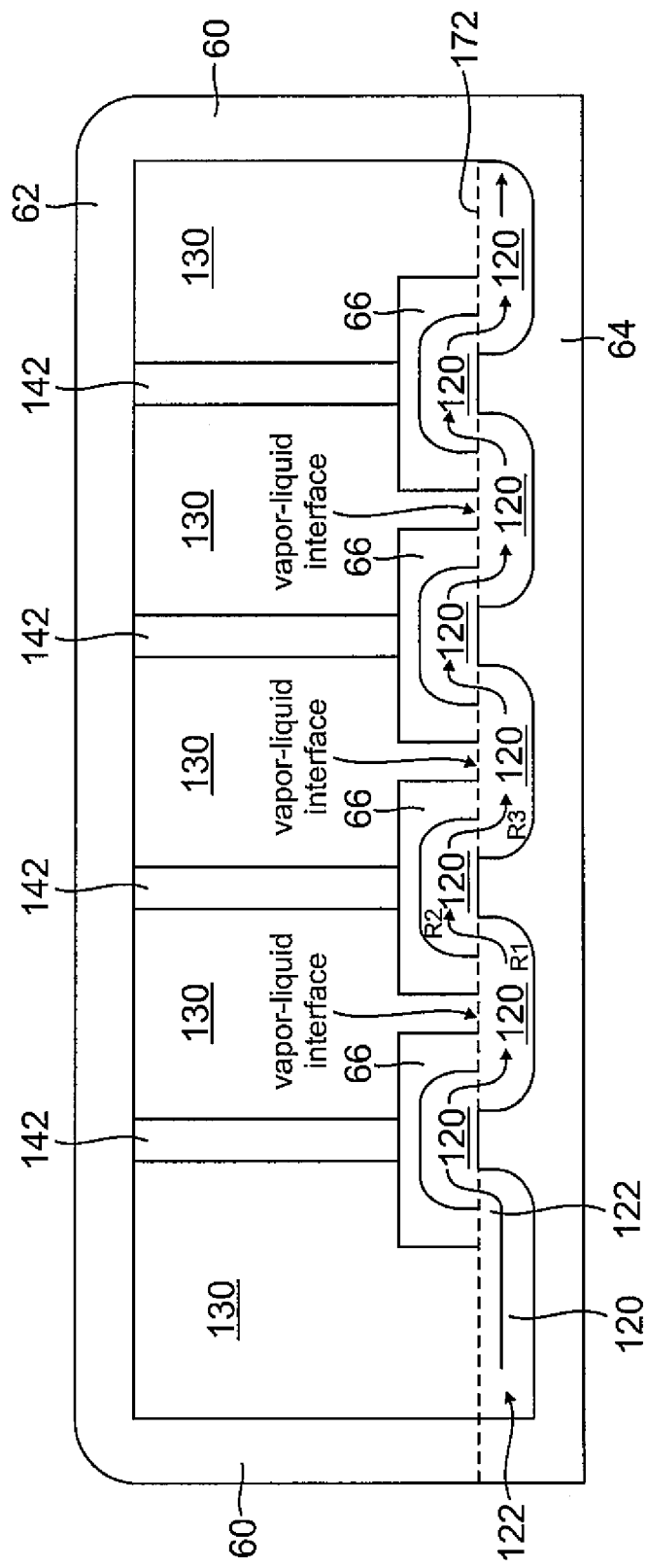
FIG. 10 is a cross-sectional view of a planar heat pipe having a straight-post structure and including porous layers and a patterned cap sheet placed between posts to create segmented regions in a highly permeable layer of the arterial wick, according to another embodiment.

In additional embodiments of the present invention, the heat pipe 100 may be configured to trap vapor bubbles within segments or regions R1-R3 to keep the vapor bubbles from spreading into other segments or regions (R1-R3), for example as shown in FIG. 10, thus providing a vapor tolerant arterial wick structure 122. FIG. 9 is a perspective view of the partial patterned facesheet 64 (for example as shown in FIG. 8 and including mechanical posts 162 in the liquid region 120) including porous layers 172 placed between posts 162 in the facesheet 64 to create segmented regions R1 and R2 (for example) in the highly permeable layer 150 of the arterial wick 122, according to an embodiment. The prevention of vapor bubble expansion and motion within the high permeability layer 150 of the heat pipe 100 according to this embodiment is achieved by segmenting the high permeability layer 150 into a number of regions R1 and R2 (for example). Each of these regions R1 and R2, according to this embodiment, would be in fluid communication with one or more other regions R1 or R2 through one or more porous layers 172 that are resistant to vapor/vapor bubble movement. The porous layers 172 according to this embodiment can be formed from a mesh window, a small hydraulic diameter hole, a sintered powder plug, etc., having pore sizes small enough to inhibit a vapor bubble from moving across the porous layer 172 resulting from the higher capillary pressure of the porous layer 172 compared to the high permeability layer 150. The porous layer 172, thus, according to this embodiment, acts as a high capillary pressure layer 152 in the lateral directions of the heat pipe 100 between posts 162 in the facesheet 64 within the liquid region 120. The placement of porous layers 172 according to this embodiment helps limit vapor bubbles that may form to the size and location of the single region (i.e., R1 or R2) in which they form, so that the vapor bubbles cannot move over and block another region (i.e., from R1 to R2 or vice versa). Accordingly, vapor bubbles, in this embodiment, may be inhibited from moving and coalescing beyond a given region R1 or R2, thus preventing large vapor plugs in the arterial wick structure 122 of the heat pipe 100. Moreover, with regards to a vapor connection across the high capillary pressure layer 152, this embodiment further inhibits vapor from the vapor region 130 from expanding within the liquid region 120 beyond the given region R1 or R2.

Figure 11:
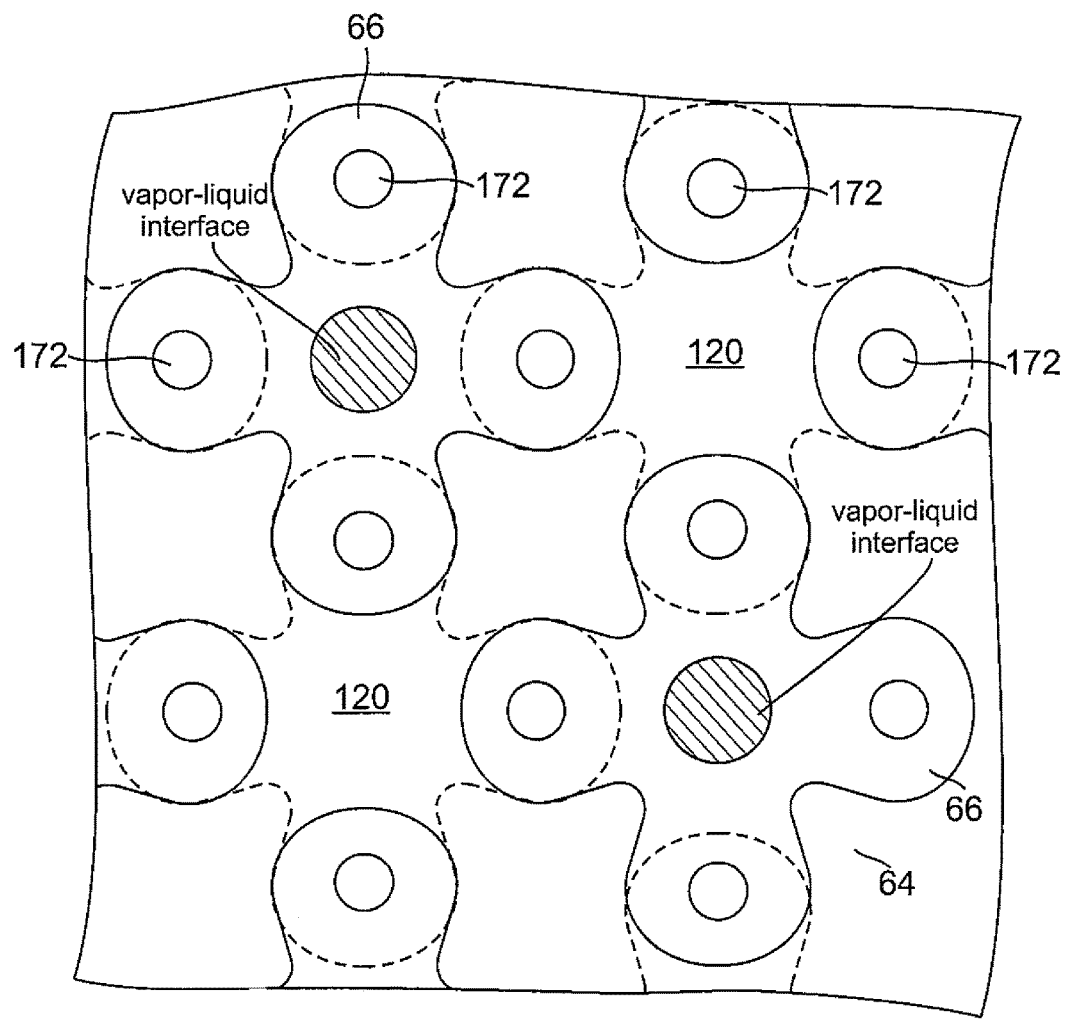
FIG. 11 is a plan view of a portion of the arterial wick structure of FIG. 10.

FIG. 10 is a cross-sectional view of the planar heat pipe 100 having a straight-post structure 162 in the liquid region 120 and including porous layers 172 and a patterned cap sheet 66 placed between posts 162 to create segmented regions R1, R2, and R3 (for example) in the highly permeable layer 150 of the arterial wick 122, according to another embodiment. FIG. 11 is a plan view of the arterial wick structure of FIG. 10. The embodiment shown in FIGS. 10 and 11 is similar to that shown in FIG. 9, except that the embodiment in FIGS. 10 and 11 is a more manufacturing-friendly version of the embodiment in FIG. 9, while the embodiment in FIG. 9 may more effectively prevent large vapor plugs in the arterial wick structure 122 of the heat pipe 100. The heat pipe 100 according to this embodiment includes a patterned bottom facesheet 64 defining the HPL 150 within the liquid region 120. The heat pipe 100, according to this embodiment, further includes a patterned cap sheet 66, as shown in FIG. 10, defining a stepped or "cloverleaf" pattern (as shown in FIG. 11) arterial wick 122 within the liquid region 120. The heat pipe 100, according to this embodiment, further includes at least one porous layer 172 between the posts 66 extending in a direction parallel to the facesheets 62 and 64 such that liquid region 120 is not continuous in this particular embodiment, but rather, the liquid region 120 is defined by the cloverleaf pattern shown in the plan view in FIG. 11. The vapor-liquid interface, accordingly, is defined by a region between the posts 162 and the segmented vapor regions 130 and where the patterned cap sheet 66 is discontinuous at the porous layer 172 (as shown in FIGS. 10 and 11). In this embodiment, segmented regions R1, R2, R3, etc., may be formed at the cloverleaf patterns shown in FIG. 11, and similar to the features of the embodiment of FIG. 9, these regions R1-R3 are configured to trap vapor bubbles from spreading beyond the porous layers 172 or the patterned cap sheet 66 to adjacent regions R1-R3.

A method of manufacturing a planar heat pipe 100 with an architected core and a vapor tolerant arterial wick 122 or 124 according to an embodiment of the present invention includes creating a first (bottom) facesheet 64 from materials known and appreciated in the art as suitable for use with planar heat pipes 100, for example metal foils having a thickness less than 1 millimeter (mm). In one embodiment, the facesheet 64 is a metal foil with a thickness ranging from approximately (about) 0.25 mm to approximately (about) 0.50 mm. The facesheet 64, according to an embodiment, includes a pattern, for example mechanical or short posts 162, forming the high permeability layer 150 of the heat pipe 100. The pattern in the facesheet 64, for example the posts 162, can be formed via any suitable method known or appreciated in the art for patterning a facesheet 64, including chemical etching, mechanical machining (e.g. milling), laser cutting, electrochemical etching, etc. In an embodiment, rather than short posts 162 in the facesheet 64, the patterning can be a set of ridges or a combination of posts and ridges.

Next, according to an embodiment of the present invention, after the bottom facesheet 64 and posts 162 have been formed, defining the high permeability layer 150, the high capillary pressure layer 152 is created from materials known and appreciated in the art as suitable for use with planar heat pipes 100, and from the same material as the bottom facesheet 64, for example metal foils. In one embodiment, the high capillary pressure layer 152 is made from a metal foil with a thickness less than 100 µm and having an array of holes defining the pores 154 of the HCPL 152. According to an embodiment, the holes or pores 154 in the high capillary pressure layer 152 can be manufactured, additively, for example, by electroplating through a mask, through 3D printing, etc. In another embodiment, the holes or pores 154 in the high capillary pressure layer 152 can be manufactured subtractively, for example, by chemical etching, plasma etching, electrochemical etching, laser machining, mechanical machining, vapor deposition such as sputtering or evaporation with a photoresist lift-off process, etc. In other embodiments, the metal foil of the high capillary pressure layer 152 may be a woven wire mesh. In another embodiment, the metal foil of the high capillary pressure layer 152 may be an electroplated mesh. As discussed above, the high capillary pressure layer 152 includes at least one vapor-venting pore 154 having a minimum diameter $D_p$ less than or equal to the size of the other pores in the HCPL layer 152. The size and placement of the holes or pores of the high capillary pressure layer 152, including the vapor-venting pore 154 diameter $D_p$ and thickness δ of the vapor-venting pore 154 (and other pores), is determined based on the formulas discussed above.

Next, according to an embodiment of the present invention, after the high capillary pressure layer 152 is created, the core or structure 140, 142 of the vapor region 130 is manufactured. In an embodiment where the core includes posts 142, for example short posts similar to those in the bottom facesheet 64, the posts 142 can be created in much the same manner and using the same or similar techniques and materials as described above with reference to the first (bottom) facesheet 64. In embodiments where the core includes a micro-lattice or micro-truss structure 140, a polymer micro-lattice (or micro-truss) template can be used or utilized. According to an embodiment, a self-propagating photopolymer waveguide process can be used or utilized to create a three-dimensional (3-D) micro-lattice (or micro-truss) structure 140, using (utilizing) the techniques and materials as described in U.S. Pat. No. 7,382,959 to Jacobsen (incorporated herein by reference in its entirety). In an embodiment, the solid struts of the 3-D micro-lattice (or micro-truss) structure 140 can be converted to solid struts by casting the struts in a mold made around the micro-lattice (or micro-truss). In this embodiment, the solid struts can me manufactured from materials including aluminum, copper, steels, super alloys, other metal materials, etc. In an embodiment, the solid struts can then be converted to coated struts using a conformal coating technique, for example, by electrodeposition (i.e., electroplating, electroless plating, etc.), chemical vapor deposition (CVD), plasma enhanced CVD, slurry coating, or sintering. Some of the techniques for converting the struts to coated struts of this embodiment may require oxidizing or carbonizing the polymer core prior to deposition. In another embodiment, the struts can be converted to hollow struts, by first converting to solid struts, coating the solid struts, and then selectively etching out cores from the coated struts.

Next, according to an embodiment of the present invention, after the core or structure 140, 142 of the vapor region 130 is created, the frame 60 of the heat pipe 100 is manufactured. In an embodiment, the frame 60 is created by a mechanical machining technique and includes at least one fill tube 40 for filling the heat pipe 100 during use and testing.

According to an embodiment of the present invention, after the frame 60 and the fill tube 40 are created, the top facesheet 62 of the heat pipe 100 is manufactured in a manner and using (utilizing) materials similar to the bottom facesheet 64. In an embodiment, the top facesheet 62 includes a metal foil material having at thickness less than 1 millimeter (mm). In one embodiment, the facesheet 62 is a metal foil with a thickness ranging from approximately (about) 0.25 mm to approximately (about) 0.50 mm.

According to an embodiment, after the bottom facesheet 64 including patterning and/or mechanical or short posts 162, the high permeability layer 150, the high capillary pressure layer 152, the core or structure 140, 142 of the vapor region 130, the frame 60 including at least one fill tube 40, and top facesheet 62 are fabricated, a bonding agent is applied to assemble the heat pipe 100. In one embodiment, the bonding agent is applied to tops of the posts or ridges 162 of the patterned bottom facesheet 64, to a top perimeter of the bottom facesheet 64, to any parts of the frame 60 that contact the patterned bottom facesheet 64 and the top facesheet 62, to a bottom perimeter of the top facesheet 62, and in embodiments including mechanical posts 142 in the core of the vapor region 130, to ends of the posts 142 that will be in contact with the tops of the posts or ridges 162 of the patterned bottom facesheet 64, otherwise to the ends of the micro-lattice or micro-trust 140 that will be in contact with the posts or ridges 162 of the patterned bottom facesheet 64. In an embodiment, the bonding agent applied to the various components of the heat pipe 100 may include epoxy, solder, brazing paste, brazing tape, etc.

According to an embodiment, after the bonding agent has been applied to the components of the heat pipe 100, the heat pipe 100 can be assembled with the patterned (bottom) facesheet 64 at the bottom (which includes the HPL 150), followed by the HCPL 152 (or the OCPL 158) and then the HCPL 152 in embodiments including a hierarchical arterial wick 124), followed by the core (micro-lattice or micro-truss 140 or posts 142), and then the frame 60 and top facesheet

62. In an embodiment, once the components have been assembled, bonding may require curing the epoxy (where epoxy is the adhesive agent used), or brazing or soldering the assembly by applying heat until the respective brazing paste or tape or solder melts (but prior to any components of the heat pipe 100 melting).

Optionally, once the heat pipe 100 has been assembled and bonded, an interior of the heat pipe 100 can be cleaned, according to an embodiment, by introducing a cleaning fluid through the fill tube 40 accommodated in the frame 60, and then removing the fluid once cleaning is complete. In an embodiment, once cleaning is complete, the interior of the heat pipe 100 must be completely evacuated.

Prior to operating the heat pipe 100, according to an embodiment of the invention, the heat pipe 100 can be filled with the working fluid from the fill tube 40. The operation of the heat pipe 100 and the working fluid volume can then be tested and adjusted. In an embodiment, once testing and adjusting of the working fluid volume is complete, the fill tube(s) 40 can be sealed and the heat pipe 100 ready for use.

In other embodiments of the heat pipe 100, an additional patterned facesheet 64 and an additional high capillary pressure layer 152 (or other capillary pressure layer 158) can be manufactured and assembled with the heat pipe 100 in lieu of the top facesheet 62. In another embodiment, where the arterial wick 124 is hierarchical, multiple layers of the high (or other) capillary pressure layers 152 (158), spacer layers 170, and multiple high permeability layers 150 can be created and assembled according to the patterns described above with reference to hierarchical arterial wicks 124. In these embodiments, the spacer layers can be created using (utilizing) the same techniques and materials used (utilized) to form the high (or other) capillary pressure layers 152 (or 158). Embodiments of the present invention are not limited to the methods described herein, as would be appreciated by those skilled in the art.

In other embodiments of a heat pipe 100 of the present invention, a distance between the evaporator region 10 and the condenser region 20 could be increased, resulting in an increase in the product of the power and the distance between the evaporating region and the condensing region. In other embodiments, a combination of an increased distance between the evaporator region 10 and the condenser region 20 and any or some of the features described above may also be utilized for maximum increase in heat flux benefits.

While this invention has been described in detail with particular references to embodiments, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," "top," "bottom," "middle," and similar have been used herein to describe a spatial relationship of one element to another, it should be understood that these terms are intended to encompass different orientations of the various elements and components of the invention in addition to the orientation depicted in the figures. Additionally, as used herein, the term "substantially," "about," "approximately," and similar are used as terms of approximation and not as terms of degree, and are intended to account for the inherent deviations in measured or calculated values that would be recognized by those of ordinary skill in the art.

Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or other components may also be present therebetween. Moreover, when a component is referred to as being "coupled" to another component, it can be directly attached or connected to the other component, or other intervening components may also be present therebetween.

While the invention has been described in connection with certain embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A planar heat pipe for transferring heat between a higher temperature region and a lower temperature region, the heat pipe comprising:
    a bottom facesheet;
    a top facesheet;
    a hierarchical vapor venting arterial wick between the bottom facesheet and the top facesheet, the hierarchical vapor venting arterial wick comprising a permeability layer comprising at least one permeability sub-layer and a capillary pressure layer comprising at least two capillary pressure sub-layers, each sub-layer comprising pores;
    a liquid region defined by the permeability layer; and
    a vapor region, wherein the vapor region and the liquid region are on opposite sides of the capillary pressure layer,
        wherein one of the at least two capillary pressure sub-layers is a middle capillary pressure sub-layer and another one of the at least two capillary pressure sub-layers is a top capillary pressure sub-layer, wherein an average pore diameter in the permeability sub-layer is greater than an average pore diameter in each of the two capillary pressure sub-layers,
        wherein an average pore diameter in the middle capillary pressure sub-layer is greater than a largest pore diameter in the top capillary pressure sub-layer, and
        wherein, when liquid is in the liquid region, the permeability layer is configured to permit the liquid to flow laterally through the permeability layer and the hierarchical vapor venting arterial wick is configured to vent vapor bubbles forming in the liquid region of the heat pipe first through the permeability layer to the middle capillary pressure sub-layer, and then from the middle capillary pressure sub-layer to the top capillary pressure sub-layer such that the vapor bubbles are vented through progressively smaller pores from the liquid region to the vapor region.

2. The planar heat pipe of claim 1, further comprising an architected mechanical core structure between the hierarchical vapor venting arterial wick and the top facesheet, and a working fluid between the bottom facesheet and the top facesheet, wherein
    the bottom facesheet comprises mechanical posts spaced at intervals corresponding with the pores in the permeability layer such that the spacing between posts defines a pore diameter in the permeability layer and a height of the posts defines a thickness, the permeability layer is below the capillary pressure layer in the liquid region of the heat pipe, and the architected mechanical core structure comprises the vapor region, and the hierarchical vapor venting arterial wick comprises the liquid region.

3. The planar heat pipe of claim 1, wherein a pore thickness and a pore diameter of a pore of the pores in the top capillary pressure sub-layer and the middle capillary pressure sub-layer, along with a height of the permeability layer, a contact angle of a working fluid in the heat pipe, and a surface tension of the working fluid satisfy inequalities, $$D_{p,1} \geq \sqrt{\frac{\tau_1 h_1}{\cos\theta}\left(2 - \frac{\tau_1 \cos\theta}{h_1}\right)},$$

$$D_{p,2} \geq \sqrt{\frac{\tau_2 h_{2,\it{eff}}}{\cos\theta}\left(2 - \frac{\tau_2 \cos\theta}{h_{2,\it{eff}}}\right)},$$

and $$h_{2,\it{eff}} = h_2 + \frac{D_{p,2}}{2}(\sec\theta - \tan\theta)$$

wherein $D_{p,2}$ is the pore diameter of the top capillary pressure sub-layer, $\tau_2$ is the pore thickness of the pore in the top capillary pressure sub-layer, $h_2$ is a distance between the top capillary pressure sub-layer and the middle capillary pressure sub-layer, $D_{p,1}$ is the pore diameter of the middle capillary pressure sub-layer, $\tau_1$ is a distance between the bottom of the middle capillary pressure sub-layer and a top of the top capillary pressure sub-layer, $h_1$ is a height of the permeability sub-layer, and $\theta$ is the contact angle of the working fluid in a liquid phase to a solid material of the top capillary pressure sub-layer.

4. The planar heat pipe of claim 1, wherein a pore thickness and a pore diameter of a pore of the pores in the top capillary pressure sub-layer and the middle capillary pressure sub-layer, along with a height of the permeability sub-layer, a contact angle of a working fluid in the heat pipe, and a surface tension of the working fluid satisfy a set of inequalities, $$1 - \sqrt{1 - \overline{D}_{p,1}^2} + \left[1 - \sqrt{1 - (\overline{S}_1 \overline{D}_{p,1})^2}\right]\bigg/\overline{S}_1 \geq 2\overline{\delta}_1,$$

wherein $\overline{D}_{p,1} = D_{p,1} \cos\psi/D_{a,1},$ $\overline{S}_1 = (P_{vs} - P_l)/(4\sigma \cos\psi)/D_{a,1},$ and $\overline{\delta}_1 = \delta_1 \cos\psi/D_{a,1},$ and wherein $$1 - \sqrt{1 - \overline{D}_{p,2}^2} + \left[1 - \sqrt{1 - (\overline{S}_2 \overline{D}_{p,2})^2}\right]\bigg/\overline{S}_2 \geq 2\overline{\delta}_2,$$

$\overline{D}_{p,2} = D_{p,2} \cos\psi/D_{a,2},$ $\overline{S}_2 = (P_{vs} - P_l)/(4\sigma \cos\psi)/D_{a,2},$ $\overline{\delta}_2 = \delta_2 \cos\psi/D_{a,2},$ and $$D_{a2,\it{eff}} = D_{a2} + \frac{D_{p,2}}{2}(\sec\psi - \tan\psi),$$

wherein $D_{p,1}$ is the pore diameter of the pore in the middle capillary pressure sub-layer, $D_{a,1}$ is a is a height of the permeability sub-layer, $\psi$ is the contact angle of the working fluid in a liquid phase to a solid material of the top capillary pressure sub-layer, $\delta_1$ is a distance between a bottom of the middle capillary pressure sub-layer and a top of the top capillary pressure sub-layer, $\sigma$ is a surface tension of the working fluid, $(P_{vs} - P_l)$ is a pressure difference between a vapor and a liquid in the heat pipe, $D_{p,2}$ is the pore diameter of the pore in the top capillary pressure sub-layer, $D_{a,2}$ is a distance between the top capillary pressure sub-layer and the middle capillary pressure sub-layer, and, $\delta_2$ is the pore thickness of the pore in the top capillary pressure sub-layer.

5. The planar heat pipe of claim 1, further comprising a spacer in between the at least two capillary pressure sub-layers, the spacer being configured to structurally support the top capillary pressure sub-layer.

6. A planar heat pipe comprising:

a bottom facesheet;

a top facesheet;

a hierarchical vapor venting arterial wick between the bottom facesheet and the top facesheet, the hierarchical vapor venting arterial wick comprising:

a permeability layer defining a liquid region proximate to the bottom facesheet, the permeability layer comprising at least one permeability sub-layer; and a capillary pressure layer between the permeability layer and the top facesheet, the capillary pressure layer comprising at least first and second capillary pressure sub-layers, the first capillary pressure sub-layer being between the second capillary pressure sub-layer and the permeability layer, wherein each sub-layer comprises pores; and a vapor region between the capillary pressure layer and the top facesheet, the vapor region and the liquid region being on opposite sides of the capillary pressure layer, wherein an average pore diameter in the permeability sub-layer is greater than an average pore diameter in each of the first and second capillary pressure sub-layers wherein the average pore diameter in the first capillary pressure sub-layer is greater than a largest pore diameter in the second capillary pressure sub-layer, and wherein, when liquid is in the liquid region, the permeability layer is configured to permit the liquid to flow through the permeability layer and the hierarchical vapor venting arterial wick is configured to vent vapor bubbles forming in the liquid region of the heat pipe first through the permeability layer to the first capillary pressure sub-layer, and then from the first capillary pressure sub-layer to the second capillary pressure sub-layer such that the vapor bubbles are vented through progressively smaller pores from the liquid region to the vapor region.

7. The planar heat pipe of claim 6, further comprising a spacer between the first and second capillary pressure sub-layers.

8. The planar heat pipe of claim 6, further comprising an architected mechanical core structure between the vapor venting arterial wick and the top facesheet; and a working fluid in the liquid region, wherein the architected mechanical core structure is in the vapor region.

9. The planar heat pipe of claim 8, wherein the architected mechanical core structure comprises a micro-lattice layer, a micro-truss layer, ridges, and/or posts.

10. The planar heat pipe of claim 8, wherein a pore thickness and a pore diameter of a pore of the pores in the capillary pressure layer, along with a height of the permeability layer, a contact angle of the working fluid, and a surface tension of the working fluid satisfy an inequality, $$D_p \geq \sqrt{\frac{\tau h}{\cos\theta}\left(2 - \frac{\tau\cos\theta}{h}\right)}$$

wherein $D_p$ is the pore diameter of the pore in the capillary pressure layer, $\tau$ is the pore thickness of the pore in the capillary pressure layer, $h$ is the height of the permeability layer, and $\theta$ is the contact angle of the working fluid in a liquid phase to a solid material of the capillary pressure layer.

11. The planar heat pipe of claim 10, wherein the pores in the capillary pressure layer are non-circular, and $D_p$ is equal to an inverse of a mean of the inverses of a major and a minor diameter of the pores in the capillary pressure layer.

12. The planar heat pipe of claim 10, wherein the height of the permeability layer is measured from a lower surface of the capillary pressure layer through the liquid region.

13. The planar heat pipe of claim 10, wherein the height of the permeability layer is measured from a surface directly below the pore diameter of the pore in the capillary pressure layer through the liquid region.

14. The planar heat pipe of claim 8, wherein a pore thickness and a pore diameter of a pore of the pores in the capillary pressure layer, along with a height of the permeability layer, a contact angle of the working fluid, and a surface tension of the working fluid satisfy an inequality, $$\left[1 - \sqrt{1 - \overline{D}_p^2} + \left[1 - \sqrt{1 - (\overline{S}\overline{D}_p)^2}\right]\right]/\overline{S} \geq 2\overline{\delta},$$

wherein $D_p$ is the pore diameter of the pore in the capillary pressure layer, $D_a$ is the height of the permeability layer, $\psi$ is the contact angle of the working fluid in a liquid phase to a solid material in the capillary pressure layer, $\delta$ is the pore thickness of the pore in the capillary pressure layer, $\sigma$ = is the surface tension of the working fluid, and $(P_{vs} - P_l)$ is a pressure difference between a vapor and a liquid in the planar heat pipe, wherein, $\overline{D}_p = D_p \cos\psi / D_a$, $\overline{S} = (P_{vs} - P_l)/(4\sigma \cos\psi / D_a)$, and $\overline{\delta} = \delta \cos\psi / D_a$.

15. The planar heat pipe of claim 8, wherein the bottom facesheet comprises mechanical posts spaced at intervals corresponding with the pores in the permeability layer such that the spacing between posts defines a pore hydraulic diameter in the permeability layer and a height of the posts defines a thickness, and wherein the permeability layer is below the capillary pressure layer in the liquid region, and the pore hydraulic diameter satisfies an equation 4*[(Wetted Area)/(Liquid Volume)].

16. The planar heat pipe of claim 15, wherein the architected mechanical core structure of the vapor region and the mechanical posts of the liquid region at least partially align and comprise at least one point of contact such that the architected mechanical core structure and the mechanical posts are coupled at this at least one point of contact.

17. The planar heat pipe of claim 15, wherein the architected mechanical core structure comprises a three-dimensional micro-lattice structure.

18. The planar heat pipe of claim 15, wherein the architected mechanical core structure comprises straight posts configured to align with the mechanical posts of the liquid region.

19. The planar heat pipe of claim 15, wherein the capillary pressure layer defines a top perimeter of the liquid region, and wherein a top surface of the capillary pressure layer comprises, in-part, a liquid-vapor interface between the liquid region and the vapor region of the planar heat pipe.

20. The planar heat pipe of claim 15, wherein the mechanical posts of the bottom facesheet are integral with the bottom facesheet such that the bottom facesheet is patterned.

* * * * *